(12) United States Patent
Shikata et al.

(10) Patent No.: US 10,999,571 B2
(45) Date of Patent: May 4, 2021

(54) DISPLAY CONTROL APPARATUS, DISPLAY CONTROL METHOD, AND STORAGE MEDIUM

(71) Applicant: CANON KABUSHIKI KAISHA, Tokyo (JP)

(72) Inventors: Yasushi Shikata, Tama (JP); Yoshiki Iwakiri, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/724,009

(22) Filed: Dec. 20, 2019

(65) Prior Publication Data

US 2020/0128230 A1  Apr. 23, 2020

Related U.S. Application Data

(63) Continuation of application No. PCT/JP2018/023063, filed on Jun. 18, 2018.

(30) Foreign Application Priority Data

Jun. 23, 2017 (JP) .............................. JP2017-123318
Feb. 9, 2018 (JP) .............................. JP2018-022067

(51) Int. Cl.
  *H04N 13/349* (2018.01)
  *H04N 13/282* (2018.01)
  *H04N 13/398* (2018.01)

(52) U.S. Cl.
  CPC ......... *H04N 13/349* (2018.05); *H04N 13/282* (2018.05); *H04N 13/398* (2018.05)

(58) Field of Classification Search
  USPC ......................................................... 348/151
  See application file for complete search history.

(56) References Cited

U.S. PATENT DOCUMENTS

| 5,729,471 | A | 3/1998 | Jain et al. |
| 2001/0033332 | A1 | 10/2001 | Kato et al. |
| 2007/0022455 | A1 | 1/2007 | Endou et al. |
| 2010/0026809 | A1* | 2/2010 | Curry ................. H04N 5/23238 348/157 |
| 2010/0248804 | A1* | 9/2010 | Matsumaru ............. A63F 13/10 463/4 |
| 2012/0069187 | A1 | 3/2012 | Ozaki et al. |

(Continued)

FOREIGN PATENT DOCUMENTS

| CN | 105284108 A | 1/2016 |
| EP | 3618429 A1 | 3/2020 |

(Continued)

*Primary Examiner* — Behrooz M Senfi

(74) *Attorney, Agent, or Firm* — Canon U.S.A., Inc. IP Division

(57) ABSTRACT

A display control apparatus configured to perform display control so as to display information on a plurality of image capturing apparatuses configured to capture images for generating a virtual viewpoint image includes acquisition means configured to acquire information on the plurality of image capturing apparatuses, and display control means configured to cause a display unit to display information on a communication connection of the plurality of image capturing apparatuses for transmitting an image captured by each of the plurality of image capturing apparatuses based on the information acquired by the acquisition means.

24 Claims, 36 Drawing Sheets

(56) References Cited

U.S. PATENT DOCUMENTS

| | | | |
|---|---|---|---|
| 2015/0371444 A1 | 12/2015 | Kazutoshi | |
| 2016/0127692 A1 | 5/2016 | Yoneji et al. | |
| 2016/0330408 A1 | 11/2016 | Costanzo | |
| 2018/0332218 A1* | 11/2018 | Yoshimura | H04N 5/247 |
| 2019/0051035 A1* | 2/2019 | Nishiyama | H04N 13/122 |
| 2019/0174112 A1* | 6/2019 | Adachi | H04N 13/139 |
| 2020/0128230 A1 | 4/2020 | Shikata et al. | |

FOREIGN PATENT DOCUMENTS

| | | | |
|---|---|---|---|
| JP | 2001008194 A | 1/2001 | |
| JP | 2003-244728 A | 8/2003 | |
| JP | 2009-60201 A | 3/2009 | |
| JP | 2010268186 A | 11/2010 | |
| JP | 2011-176452 A | 9/2011 | |
| JP | 2013-207474 A | 10/2013 | |
| JP | 2015-187797 A | 10/2015 | |
| JP | 2016-116003 A | 6/2016 | |
| JP | 6482696 B2 | 3/2019 | |
| RU | 2011149201 A | 6/2013 | |
| WO | 2016/123439 A1 | 8/2016 | |
| WO | 2018/235762 A1 | 12/2018 | |

\* cited by examiner

FIG. 12

| IMAGE CAPTURING APPARATUS IDENTIFICATION | CONNECTION GROUP | CONNECTION DESTINATION | INSTALLATION AREA INFORMATION | INSTALLATION COORDINATE INFORMATION (x, y) | IMAGING TARGET AREA |
|---|---|---|---|---|---|
| IMAGE CAPTURING APPARATUS 100-1 | L1 | IMAGE CAPTURING APPARATUS 100-2 | R1 | x1, y1 | V1 |
| IMAGE CAPTURING APPARATUS 100-2 | L1 | IMAGE CAPTURING APPARATUS 100-3 | R1 | x2, y2 | V2 |
| IMAGE CAPTURING APPARATUS 100-3 | L1 | IMAGE CAPTURING APPARATUS 100-4 | R1 | x3, y3 | V1 |
| IMAGE CAPTURING APPARATUS 100-4 | L1 | IMAGE CAPTURING APPARATUS 100-5 | R2 | x4, y4 | V2 |
| IMAGE CAPTURING APPARATUS 100-5 | L1 | IMAGE CAPTURING APPARATUS 100-6 | R2 | x5, y5 | V1 |
| IMAGE CAPTURING APPARATUS 100-6 | L1 | IMAGE CAPTURING APPARATUS 100-7 | R2 | x6, y6 | V2 |
| ... | ... | ... | ... | ... | ... |

FIG. 13

| IMAGING TARGET AREA IDENTIFICATION | AREA CENTER COORDINATES | EFFECTIVE AREA INFORMATION (RADIUS) |
|---|---|---|
| V1 | x7, y7 | vr7 |
| V2 | x8, y8 | vr8 |
| ... | ... | ... |

FIG. 14

| INSTALLATION AREA IDENTIFICATION | VERTEX COORDINATES | | | | |
|---|---|---|---|---|---|
| R1 | x9, y9 | x10, y10 | x11, y11 | x12, y12 | ... |
| R2 | x13, y13 | x14, y14 | x15, y15 | x16, y16 | ... |
| R3 | x17, y17 | x18, y18 | x19, y19 | x20, y20 | ... |
| ... | ... | ... | ... | ... | ... |

FIG. 28

| IMAGING TARGET GROUP | CONNECTION STATUS | ERROR STATUS | BYPASS STATUS | OUTPUT STATUS | CAMERA PLATFORM | MICROPHONE | OUTPUT | IRIS | ISO | SHUTTER SPEED | ND FILTER |
|---|---|---|---|---|---|---|---|---|---|---|---|
| V1: | CONNECTED | NO | NO | NO | NO | NO | BEING OUTPUT | * | 800 | 1/100 | 2stop |
| V2: | NOT CONNECTED | * | NO | NO | NO | NO | BEING OUTPUT | F4.0 | 800 | 1/100 | 2stop |

FIG. 30

| IMAGING TARGET GROUP | CONNECTION STATUS | ERROR STATUS | BYPASS STATUS | OUTPUT STATUS | CAMERA PLATFORM | MICROPHONE | OUTPUT | IRIS | ISO | SHUTTER SPEED | ND FILTER |
|---|---|---|---|---|---|---|---|---|---|---|---|
| IMAGE CAPTURING APPARATS 100-1: | CONNECTED | NO | NO | NO | NO | NO | BEING OUTPUT | F4.0 | 800 | 1/100 | 2stop |
| IMAGE CAPTURING APPARATS 100-2: | CONNECTED | TEMPERATURE ERROR | NO | NO | NO | NO | BEING OUTPUT | F4.0 | 800 | 1/100 | 2stop |
| ⋮ | ⋮ | ⋮ | ⋮ | ⋮ | ⋮ | ⋮ | ⋮ | ⋮ | ⋮ | ⋮ | ⋮ |
| IMAGE CAPTURING APPARATS 100-n: | CONNECTED | NO | NO | NO | NO | NO | BEING OUTPUT | F4.0 | 800 | 1/100 | 2stop |

DISPLAY CONTROL APPARATUS, DISPLAY CONTROL METHOD, AND STORAGE MEDIUM

CROSS-REFERENCE TO RELATED APPLICATIONS

This application is a Continuation of International Patent Application No. PCT/JP2018/023063, filed Jun. 18, 2018, which claims the benefit of Japanese Patent Application No. 2017-123318, filed Jun. 23, 2017 and Japanese Patent Application No. 2018-022067 filed Feb. 9, 2018, all of which are hereby incorporated by reference herein in their entirety.

TECHNICAL FIELD

The present invention relates to a display control apparatus, a display control method, and a storage medium.

BACKGROUND ART

In recent years, particular attention has been placed on a technique in which a plurality of image capturing apparatuses are installed at different positions, and a plurality of image capturing apparatuses synchronously capture images of a subject. Using images captured from a plurality of viewpoints, not only images as seen from installation positions of the image capturing apparatuses are obtained, but a virtual viewpoint image as seen from an arbitrary viewpoint is generated.

A virtual viewpoint image based on a plurality of viewpoint images may be generated and viewed, for example, as follows. First, images captured by a plurality of image capturing apparatuses are collected at an image generation apparatus such as a server. The image generation apparatus then performs processing such as rendering based on a virtual viewpoint using the images captured by the plurality of image capturing apparatuses to generate a virtual viewpoint image, and displays the virtual viewpoint image on a user's viewing terminal.

An impactful representation of a content as seen from a viewpoint specified by an image content producer can be produced by generating the virtual viewpoint image as seen from the viewpoint from captured images of a soccer or basketball game. A user who is viewing the content can freely change the viewpoint using a controller, a tablet device, or the like provided for the viewing terminal. In response, the image generation apparatus generates a virtual viewpoint image as seen from the viewpoint. Thus, the user can watch the game from his/her desired viewpoint. Thus, in a service using a virtual viewpoint image, a user can feel as if he/she was actually in a scene, which is not achieved by a conventional captured image whose viewpoint cannot be freely changed.

PTL 1 discloses a technique in which a user is allowed to select a desired viewpoint based on one or more images, and a virtual viewpoint image is generated from the images and information on the selected viewpoint. PTL 1 also discloses a UI (user interface) used by a user to select a desired viewpoint.

However, there is a possibility that a user cannot easily know states of constituent elements of a system that generates a virtual viewpoint image.

For example, in a case where at least one of the plurality of image capturing apparatuses break down or fails to normally capture an image, or fails to output a captured image, a problem such as a reduction in quality of a virtual viewpoint image may occur. Furthermore, in a case where imaging parameters specifying an imaging range, an exposure condition, and/or the like are not appropriately set in each of the plurality of image capturing apparatuses, a problem such as a reduction in quality of the virtual viewpoint image may also occur. However, if a user can grasp states of these image capturing apparatuses, it is possible to perform repairs or set imaging parameters, and thus it is possible to reduce the occurrence of problems such as a reduction in the quality of the virtual viewpoint image. Note that the constituent elements are not limited to the image capturing apparatuses. For example, a server that generates a virtual viewpoint image, a switch, a router, a network cable, and the like included in a system for generating a virtual viewpoint image, and the like can also be constituent elements.

In view of the problems described above, it is an object of the present invention to provide a technique for enabling a user to easily know the state of a constituent element of a system configured to generation of a virtual viewpoint image.

CITATION LIST

Patent Literature

PTL 1 Japanese Patent Laid-Open No. 2014-236896

SUMMARY OF INVENTION

The present invention provides a display control apparatus configured to perform display control so as to display information on a plurality of image capturing apparatuses configured to capture images for generating a virtual viewpoint image, including acquisition means configured to acquire information on the plurality of image capturing apparatuses, and display control means configured to cause a display unit to display information on a communication connection of the plurality of image capturing apparatuses for transmitting an image captured by each of the plurality of image capturing apparatuses based on the information acquired by the acquisition means.

Further features of the present invention will become apparent from the following description of exemplary embodiments with reference to the attached drawings.

BRIEF DESCRIPTION OF DRAWINGS

FIG. 12 is a diagram illustrating an example of data stored in a data storage unit of an information display apparatus.

FIG. 13 is a diagram illustrating an example of data stored in a data storage unit of an information display apparatus.

FIG. 14 is a diagram illustrating an example of data stored in a data storage unit of an information display apparatus.

FIG. 28 is a diagram illustrating an example of a listed description of states of image capturing apparatuses on a display image.

FIG. 30 is a diagram illustrating an example of a listed description of states of image capturing apparatuses.

DESCRIPTION OF EMBODIMENTS

Embodiments are described below with reference to drawings. The embodiments are described below by way of example for a case where an image that simulates a stadium is displayed and furthermore on this image of the simulated stadium, information is displayed to indicate at least one of the following: an installation position of each image capturing apparatus; a network connection relationship among image capturing apparatus; and a relationship between each image capturing apparatus and an imaging target area.

Figure 1:
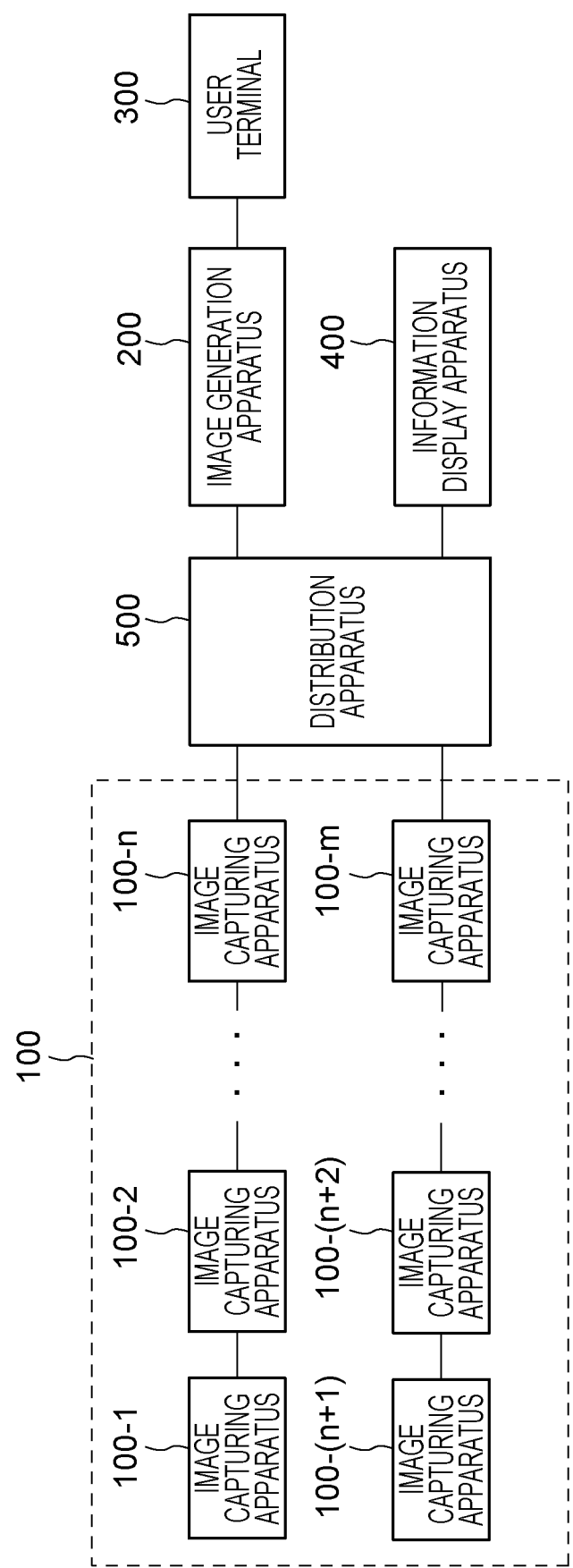
FIG. 1 is a diagram illustrating a configuration of a display system.

FIG. 1 is a diagram illustrating an example of a configuration of a display system according to the present embodiment. The display system according to the present embodiment includes an image capturing system 100 including a plurality of image capturing apparatuses 100-1, 100-2, . . . , and 100-M, an image generation apparatus 200, a user terminal 300, an information display apparatus 400, and a distribution apparatus 500. The respective apparatuses are communicably connected to each other via a transmission cable for transmitting an image and control information. Specific examples of the transmission cable include ETHERNET (registered trademark) such as GBE (Gigabit Ethernet), 10 GBE, or the like according to the IEEE standard. However, the transmission cable is not limited to these, and another type of cable may be used. Each apparatus may perform wireless communication.

The image capturing system 100 includes M image capturing apparatuses (image capturing apparatuses 100-1, 100-2, . . . , and 100-M). Hereinafter, when a description is general and not about a specific image capturing apparatus, the image capturing apparatuses 100-1, 100-2, . . . , and 100-M will be generically referred to as an image capturing apparatus 100-X. Note that M, N (described later), and X each take an integer value.

Image capturing apparatuses 100-X located adjacent to each other (for example, an image capturing apparatus 100-1 and an image capturing apparatus 100-2) are interconnected via a transmission cable. An image capturing apparatus 100-X transmits a captured image and state information of the image capturing apparatus 100-X to the image generation apparatus 200 and the information display apparatus 400. Note that the state information will be described later. In FIG. 1, the image capturing apparatuses 100-1 is interconnected with the image capturing apparatus 100-2. The image capturing apparatus 100-2 is also interconnected to another image capturing apparatus (not shown) located adjacent to the image capturing apparatus 100-2 as well as the image capturing apparatus 100-1. An image capturing apparatus 100-N is interconnected to image capturing apparatuses (not shown) located adjacent to the image capturing apparatus 100-N. The image capturing apparatus 100-N is also interconnected to the distribution apparatus 500. Although in the example shown here, the image capturing apparatuses are daisy chain connected, the image capturing apparatuses may be connected in another connection form such as a star connection or the like. In the present embodiment, there are two such connection groups. That is, the other is that of an image capturing system including image capturing apparatus 100-(N+1) to an image capturing apparatus 100-M connected in a similar manner. The number of connection groups is not limited to two, and the number of connection groups may be one or three or more.

Figure 2:
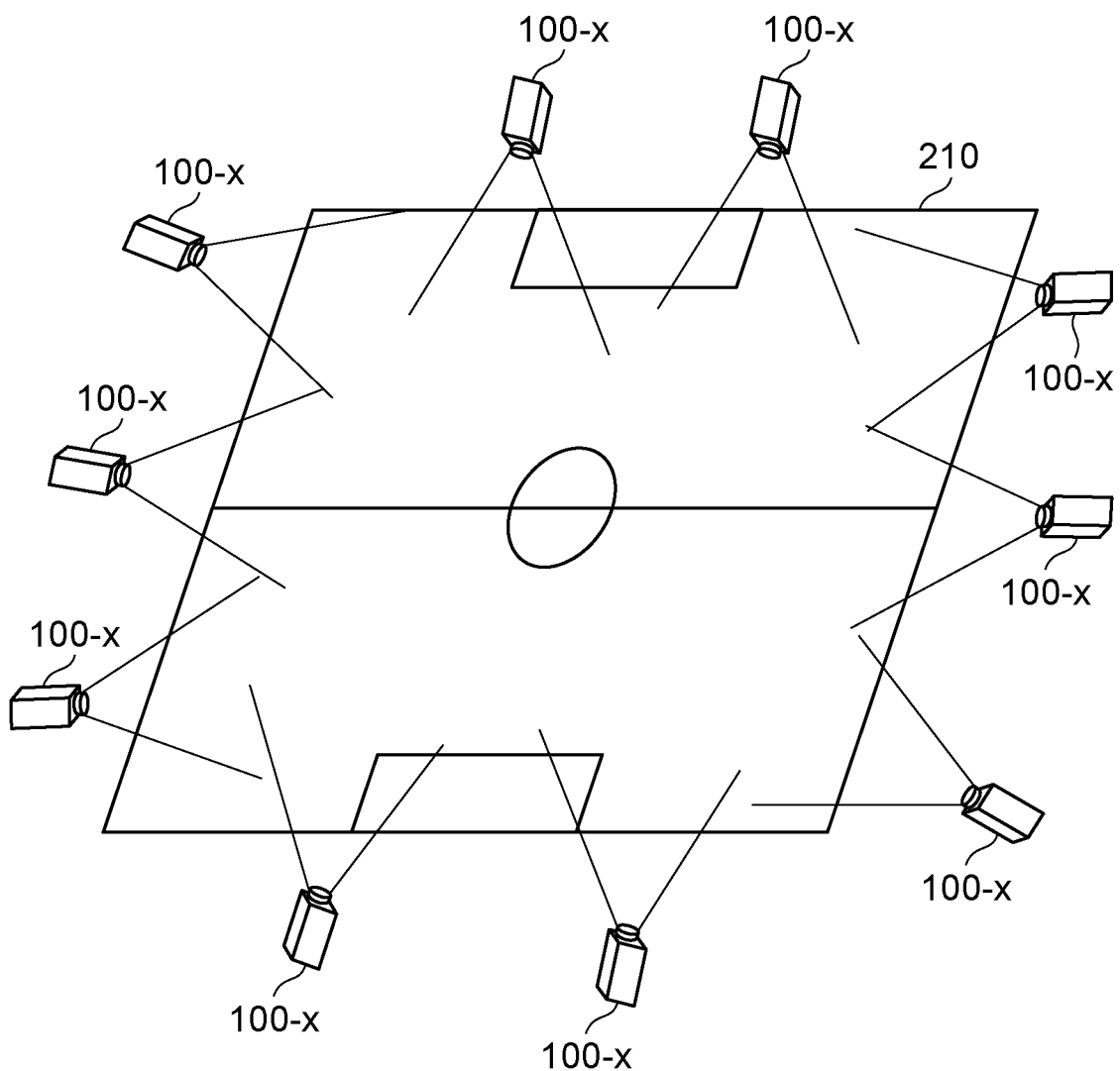
FIG. 2 is a diagram illustrating an arrangement of image capturing apparatuses.

The image capturing apparatuses 100-X are disposed so as to surround a stadium such as a soccer field or a specific subject. FIG. 2 is a diagram illustrating an example of an arrangement of image capturing apparatuses 100-X. In the example shown in FIG. 2, the plurality of image capturing apparatuses 100-X are arranged such that the entire or part of the stadium 210 such as a soccer field is imaged by the plurality of image capturing apparatuses 100-X.

The plurality of image capturing apparatuses 100-X are, for example, digital cameras, and perform imaging at the same timing based on a synchronization signal from a synchronization apparatus (not shown). Images captured by the image capturing apparatuses 100-X are transmitted to the image generation apparatus 200 and the information display apparatus 400 via the transmission cable and the distribution apparatus 500. The image capturing apparatuses 100-X may be cameras configured to capture still images, cameras configured to capture moving images, or cameras configured to capture both still images and moving images. In the present embodiment, the term "image" will be used to describe both still images and moving images unless otherwise noted.

The image generation apparatus 200 is interconnected to the image capturing apparatuses 100-X via the distribution apparatus 500. The image generation apparatus 200 is also interconnected with the user terminal 300 and the information display apparatus 400. The image generation apparatus 200 accumulates images captured by the image capturing apparatuses 100-X. When the image generation apparatus 200 receives virtual viewpoint information based on an operation of the user terminal 300, the image generation apparatus 200 generates a virtual viewpoint image corresponding to the virtual viewpoint information using the images captured by the plurality of image capturing apparatuses 100-X. The image generation apparatus 200 transmits the generated virtual viewpoint image to the user terminal 300. Note that the virtual viewpoint information includes at least position information and direction information. The position information is information indicating a relative position with respect to a predetermined position such as the center of the stadium 210 (for example, a position in a front-rear direction, a left-right direction, and an up-down direction with respect to a predetermined position). Note that the position information may be information indicating absolute coordinates. The direction information is information indicating a direction from a predetermined position (for example, an angle from each axis in a three-dimensional orthogonal coordinate system having an origin defined at a predetermined position and having axes in a front-back direction, a left-right direction, and an up-down direction). Note that the direction information may be information indicating an absolute direction. The virtual viewpoint information is information indicating a position of a viewpoint and a direction of a line of sight based on which to generate a virtual viewpoint image. The virtual viewpoint information is also information indicating a position and an orientation of a virtual camera by which a virtual viewpoint image is captured.

The image generation apparatus 200 is, for example, a server apparatus, and has a database function (described later as an image storage unit 202) and an image processing function (described later as the virtual viewpoint image generation unit 203). A database used by the image generation apparatus 200 stores in advance an image, as background image data, obtained by imaging a scene of a competition venue in a state where there is no specific subject such as a player, for example, as in a state before a competition is started. The background image data is used in a foreground-background separation process for extracting a specific subject from a captured image.

The user terminal 300 has a controller for operation. The user terminal 300 receives an instruction to change a position of a virtual viewpoint or a direction of a line of sight, or an instruction to switch a viewpoint, based on an operation on a controller by a user, and the user terminal 300 transmits a transmission signal indicating a content of the received instruction to the image generation apparatus 200. The user terminal 300 displays a virtual viewpoint image received from the image generation apparatus 200 on a display screen provided on the user terminal 300. The virtual viewpoint image may be a still image or a moving image. The user terminal 300 is, for example, a PC (PERSONAL COMPUTER) or a tablet device. The controller includes, for example, at least one of a mouse, a keyboard, a six-axis controller, and a touch panel.

The information display apparatus 400 is interconnected to the image capturing apparatuses 100-X and the image generation apparatus 200 via the distribution apparatus 500. The information display apparatus 400 receives captured images captured by the image capturing apparatuses 100-X and state information of the image capturing apparatuses 100-X, and displays them on a display screen (a display unit 404) described later. Furthermore, the information display apparatus 400 acquires, from the database, installation positions of the image capturing apparatuses 100-X, the connection relationship among the image capturing apparatuses, information on a group to which the image capturing apparatuses belong, and the like, and displays the acquired information on the display screen. The information display apparatus 400 also receives state information of the image generation apparatus 200 and displays it on the display screen. The information displayed on the information display apparatus 400 is viewed by a person in charge of monitoring. The person in charge of monitoring regularly monitors the states of the image capturing system 100 and the image generation apparatus 200 based on captured images or the like displayed on the display screen of the information display apparatus 400.

The distribution apparatus 500 distributes the captured images received from the image capturing apparatuses 100-X to the image generation apparatus 200 and the information display apparatus 400.

Figure 3:
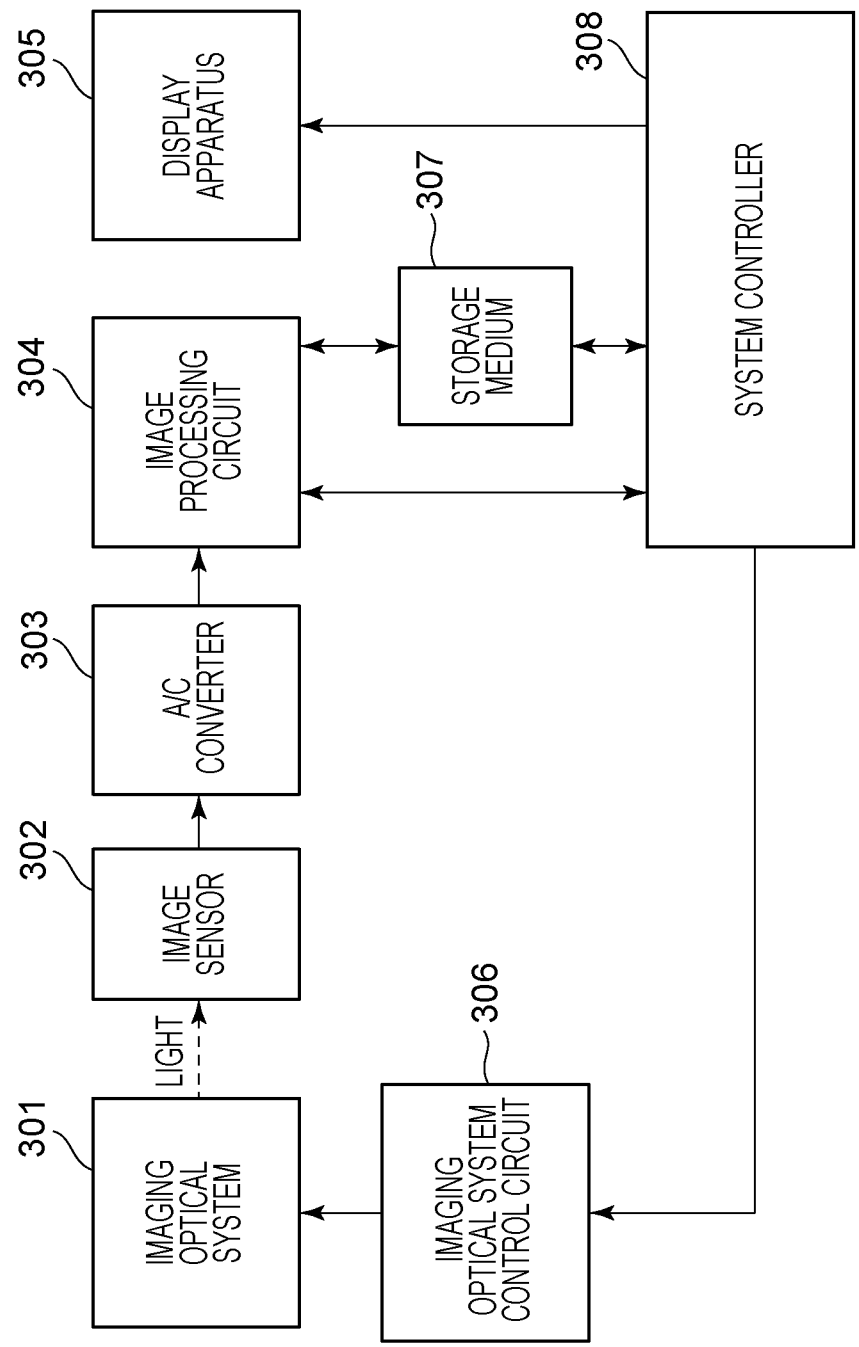
FIG. 3 is a diagram illustrating a hardware configuration of an image capturing apparatus.

Next, an example of a configuration of the image capturing apparatus 100-X is described below. FIG. 3 is a diagram illustrating an example of a hardware configuration of the image capturing apparatus 100-X. An imaging optical system 301 (an optical lens system) focuses light from a subject so as to form an image on an image sensor 302. The image sensor 302 converts the light forming the image into an electric signal, and outputs the resultant electric signal to an A/D converter 303. The A/D converter 303 converts the input electric signal into a digital signal, and inputs the converted digital signal to an image processing circuit 304. The image sensor 302 is a photoelectric conversion device that converts an optical signal of an image formed on a light receiving surface into an electric signal for each light reception pixel at a corresponding position.

A system controller 308 includes, for example, a CPU (CENTRAL PROCESSING UNIT), a ROM (READ ONLY MEMORY), a RAM (RANDOM ACCESS MEMORY), and the like. The system controller 308 controls the image capturing apparatuses 100-X by executing a computer program stored in the ROM.

The image processing circuit 304 performs various image processing on the digital signal (the image signal) input from the A/D converter 303. The image processing includes, for example, white balance adjustment, color correction, and gamma correction. The image signal subjected to image processing by the image processing circuit 304 is stored in a storage medium 307 or displayed by the display apparatus 305. The image processing circuit 304 extracts a subject such as a player from an image captured during a competition at a stadium 210 among captured images input from the imaging unit 102.

An imaging optical system control circuit 306 drives a lens or the like included in the imaging optical system 301 based on a control signal from the system controller 308. Note that the illustrated configuration of the image capturing apparatus 100-X is merely an example. The configuration does not necessarily need to include all these elements, and may include another element. For example, the display apparatus 305 is not an essential component of the image capturing apparatus 100-X.

Figure 4:
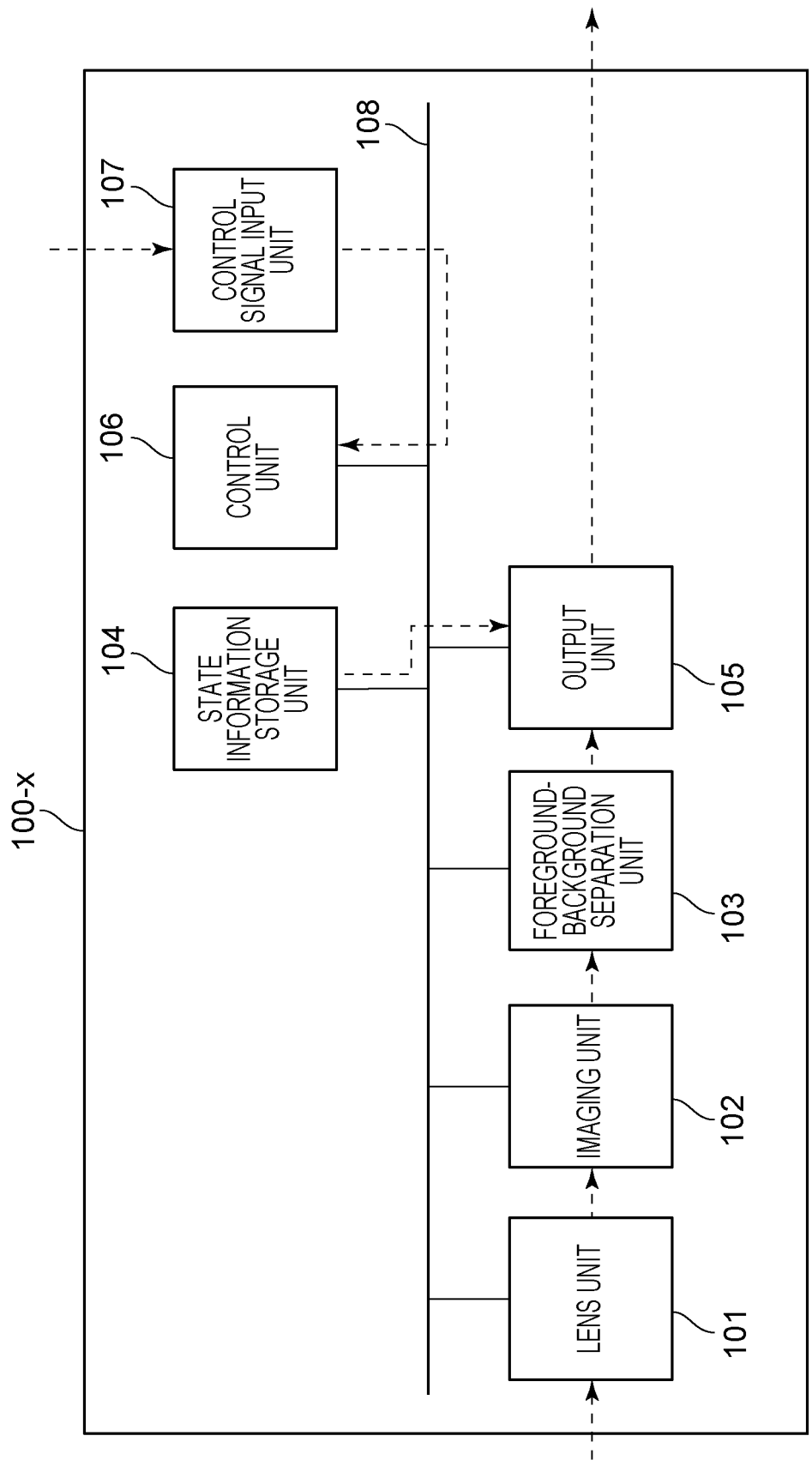
FIG. 4 is a diagram illustrating a first example of a functional configuration of an image capturing apparatus.
Figure 5:
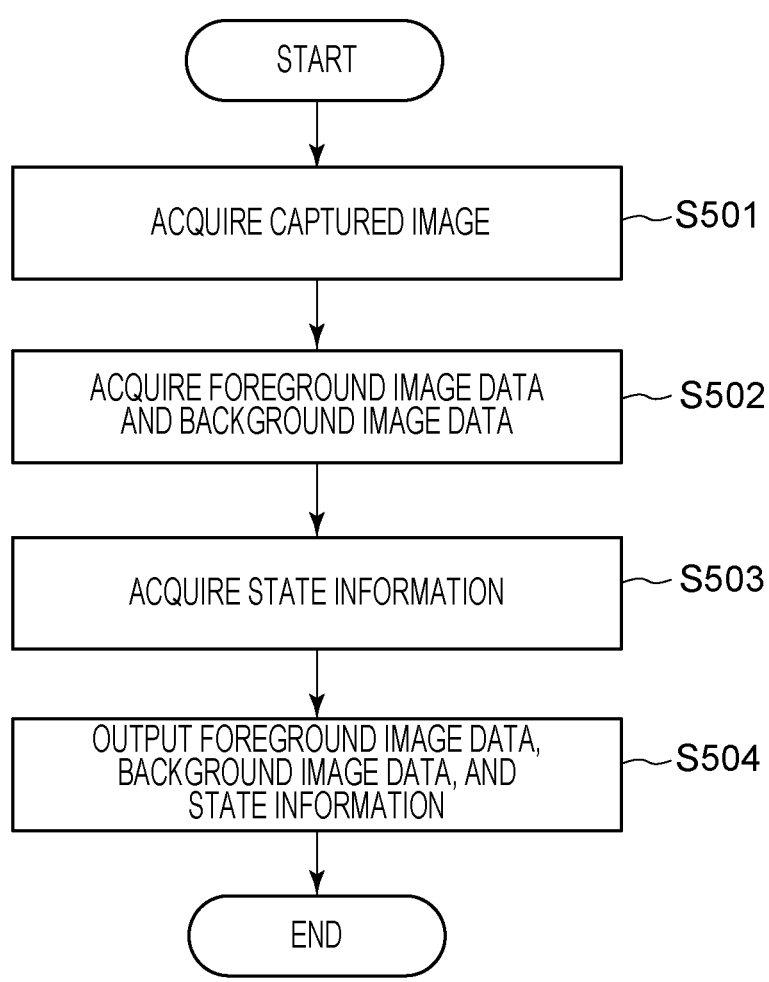
FIG. 5 is a flow chart illustrating a first example of an operation of an image capturing apparatus.

FIG. 4 is a diagram illustrating an example of a functional configuration of the image capturing apparatus 100-X according to the present embodiment. FIG. 5 is a flow chart illustrating an example of an operation of the image capturing apparatus 100-X according to the present embodiment. For example, each time a captured image is obtained by the image capturing apparatus 100-X, the process shown in the flow chart of FIG. 5 is executed. Note that the process shown in the flow chart of FIG. 5 is realized by the system controller 308 by calculating information and controlling various pieces of hardware. Note that at least part of the steps of the flow chart in FIG. 5 may be executed by dedicated hardware. The dedicated hardware may be, for example, an ASIC or an FPGA.

As shown in FIG. 4, the image capturing apparatus 100-X includes a lens unit 101, an imaging unit 102, a foreground-background separation unit 103, a state information storage unit 104, an output unit 105, a control unit 106, and a control signal input unit 107. These are interconnected via an internal bus 108, and can transmit and receive data mutually under the control of the control unit 106. The lens unit 101 in FIG. 4 corresponds to the imaging optical system 301 and the imaging optical system control circuit 306 in FIG. 3, and the imaging unit 102 in FIG. 4 corresponds to the image sensor 302 and the A/D converter 303 in FIG. 3. The processing to be executed by the foreground-background separation unit 103 in FIG. 4 is performed by the image processing circuit 304 in FIG. 3. The functions of the state information storage unit 104, the output unit 105, the control unit 106, and the control signal input unit 107 in FIG. 4 are implemented by the system controller 308 in FIG. 3. The process shown in FIG. 5 is realized by the system controller 308 in FIG. 3 by reading out various programs stored in the storage medium 307 and executing them to control various elements. An example of a configuration of each element is described in detail below.

The lens unit 101 is disposed in a front stage of the imaging unit 102, and focuses incident light from an imaging target on the imaging unit 102 so as to form an image thereon. The lens unit 101 is adjustable in terms of the zoom and focus of the lens. The imaging unit 102 performs an exposure operation on incident light of the image formed via the lens unit 101 and converts it into an electric signal. Furthermore, the imaging unit 102 also performs signal processing, such as a correction of a loss of an output from the sensor and a correction of a variation in lens optical characteristics, on the converted signal. Furthermore, the imaging unit 102 converts the captured image into a format such as RAW, JPEG (JOINT PHOTOGRAPHIC EXPERTS GROUP), or BMP (BITMAP IMAGE) based on the result of the signal processing. The captured image is output to the foreground-background separation unit 103. In the present embodiment, the captured image is acquired as described above (S501).

The foreground-background separation unit 103 extracts a specific subject such as a player from an image captured during a competition at a stadium 210 among captured images input from the imaging unit 102, and outputs it as "foreground image data" to the output unit 105 located at a following stage (S502). Furthermore, the foreground-background separation unit 103 outputs an image obtained by imaging a scene of the stadium 210 in a state in which no subject is present, for example, when a competition starts, to the output unit 105 as "background image data" (S502). Note that the foreground-background separation unit 103 may output an image remaining after the specific subject is removed from the captured image to the output unit 105 as background image data. Hereinafter, a captured image not yet subjected to the foreground-background separation is referred to as a "foreground-background pre-separated image" to distinguish it from "foreground image data" and "background image data".

Figure 6A:
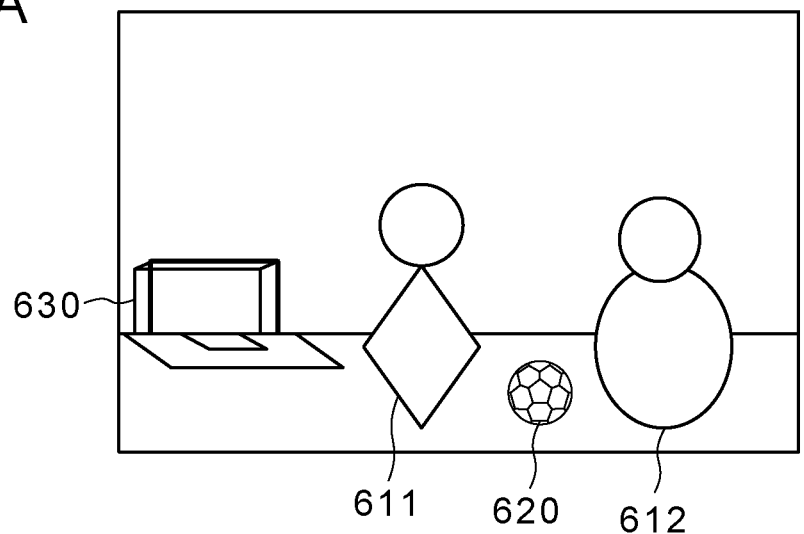
FIG. 6A is a diagram illustrating foreground image data and background image data.
Figure 6B:
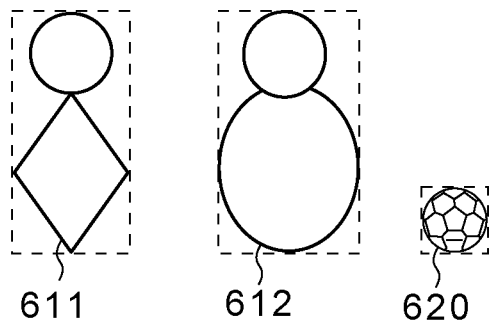
FIG. 6B is a diagram illustrating foreground image data and background image data.
Figure 6C:
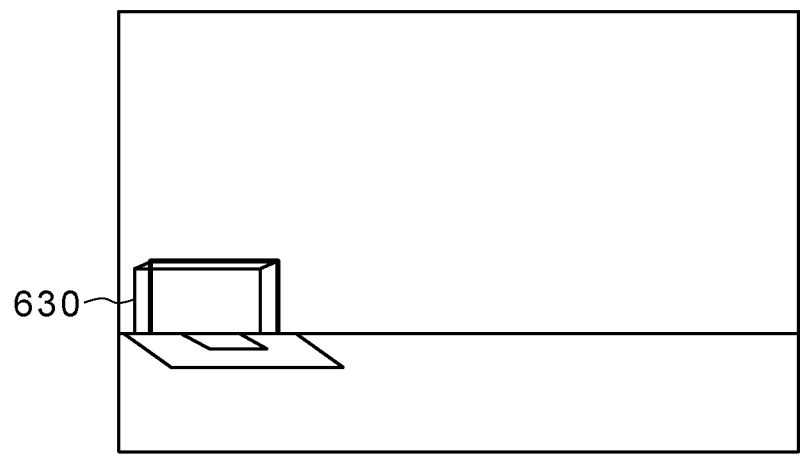
FIG. 6C is a diagram illustrating foreground image data and background image data.

FIG. 6 is a conceptual diagram illustrating examples of "foreground-background pre-separated image data", "foreground image data", and "background image data". FIG. 6A is a diagram illustrating an example of "foreground-background pre-separated image data". In this example, the foreground-background pre-separated image data is a captured image including two players 611 and 612, a soccer ball 620, and a soccer goal 630 in a soccer field of a stadium 210. FIG. 6B is a diagram illustrating an example of "foreground image data". In FIG. 6B, by way of example, the two players 611 and 612 and the soccer ball 620 are extracted as "foreground image data". Each of these is treated as separate "foreground image data". That is, in FIG. 6B, three pieces of foreground image data are generated. In the present embodiment, "foreground image data" is treated as rectangular data (see a broken line in FIG. 6B). FIG. 6C is a diagram illustrating an example of "background image data". An object having almost no time-dependent change during a competition, such as a soccer goal 630, is treated as "background image data".

As a method of separating a foreground image of a specific subject, it is allowed to use a method of image processing including an object extraction process. Object extraction is performed by extracting a difference between a captured image and a background image. The foreground image may be an image of not only a player playing a game but also, for example, another specific person (for example, at least one of a backup player, a director, and a referee). The foreground image may be an image of an object such as a ball or a goal, for which an image pattern is predetermined. Another method of detecting a foreground image may be, for example, to detect a moving object.

The state information storage unit 104 stores state information of the image capturing apparatus 100-X, and outputs information to the output unit 105 when a change in the state occurs (S503). The state information includes at least one of the following:

Communication connection status (connected, disconnected, etc.) of the image capturing apparatus 100-X Imaging status (in the middle of imaging operation, in preparation operation, in power-off operation, in power-on operation, etc.) of the image capturing apparatus 100-X Operation status (zoom operation, focus operation, iris setting, etc.) of the image capturing apparatus 100-X Output status (outputting "foreground image data" or "background image data" to the image generation apparatus 200, etc.) of the image capturing apparatus 100-X Error status (normal, temperature error, lens error, etc.) of the image capturing apparatus 100-X Configuration of the image capturing apparatus (in terms of use of a camera platform, a microphone, a zoom lens, etc.)

Imaging parameters of the image capturing apparatus (aperture value (iris), shutter speed, white balance, exposure value, ISO sensitivity, zoom, focus, ND filter, imaging mode, etc.)

The state information may be information indicating in what stage on a daisy chain the image capturing apparatus 100-X is located, address information, or information indicating a network configuration such as a network identifier of a belonging network.

The output unit 105 outputs "foreground image data" or "background image data" output from the foreground-background separation unit 103 to the image generation apparatus 200 and the information display apparatus 400 at a predetermined frame rate via the distribution apparatus 500 (S504). The output unit 105 also outputs the state information output from the state information storage unit 104 to the information display apparatus 400 via another image capturing apparatus 100-X and the distribution apparatus 500 (S504). The outputting is performed when a change occurs in one of status or when the image capturing apparatus 100-X is activated. The output unit 105 may output data at timing according to a frame rate at which the image capturing apparatus 100-X captures images.

The control unit 106 issues a control instruction to each unit of the image capturing apparatus 100-X based on control information from the control signal input unit 107 or a user I/F unit (not shown). For example, when the control unit 106 receives an adjustment parameter for exposure adjustment such as iris or ISO adjustment from the user I/F unit or the control signal input unit 107, the control unit 106 performs the exposure control on the imaging unit 102.

The control signal input unit 107 receives a control signal from the information display apparatus 400 described later, and outputs the control signal to the control unit 106. The control signal from the information display apparatus 400 may be a signal for setting imaging parameters. For example, imaging parameters include parameters related to zoom, focus, iris, ISO, shutter speed, ND filter switching, and the like.

Note that a part of the configuration of the illustrated image capturing apparatus 100-X may be implemented in another apparatus. For example, the foreground-background separation unit 103 may be implemented in an apparatus different from the image capturing apparatus 100-X. The output unit 105 may implemented in another apparatus which may output data acquired from the image capturing apparatus 100-X.

Figure 7:
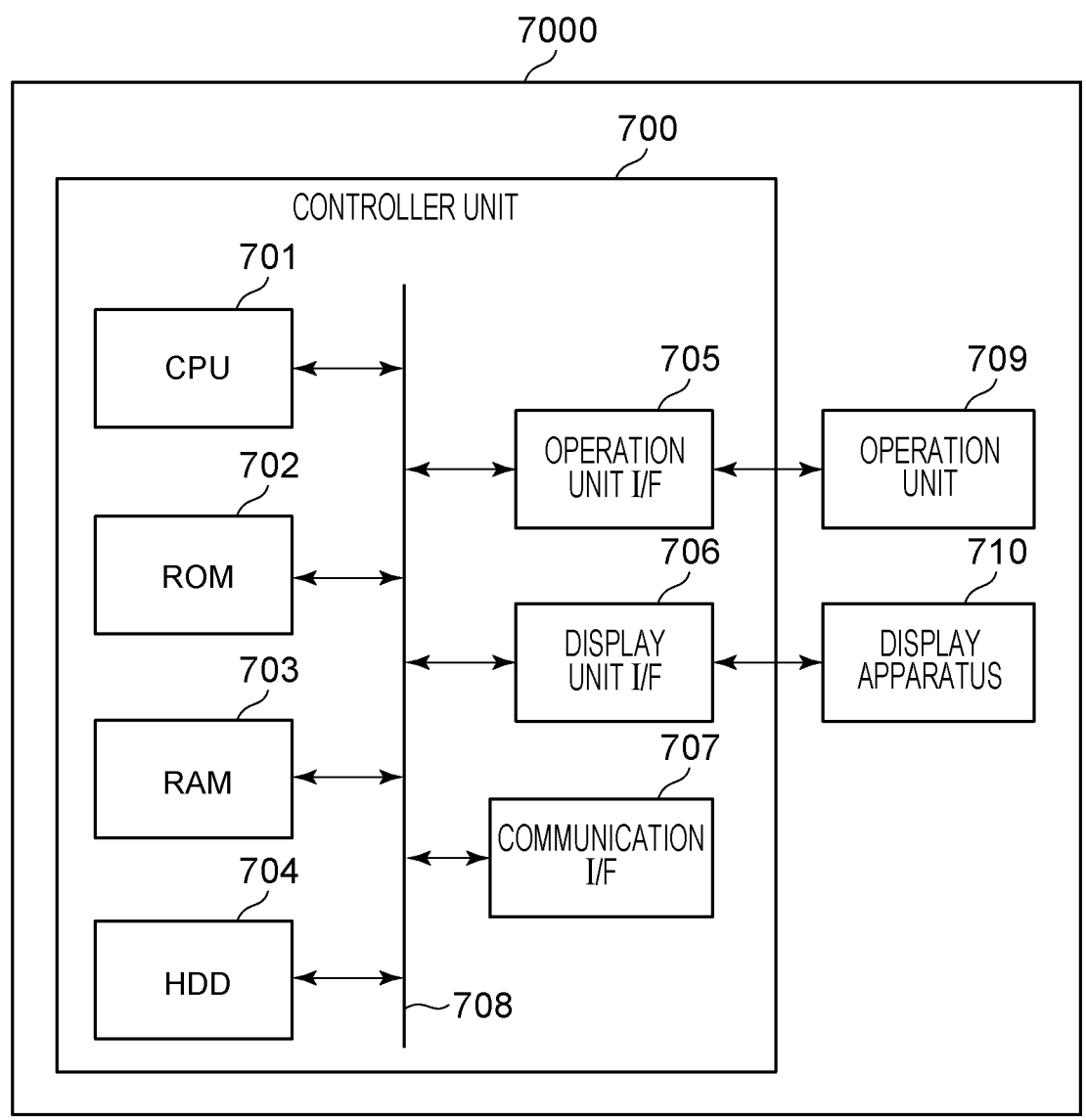
FIG. 7 is a diagram illustrating a hardware configuration of an apparatus.

Next, examples of configurations of the image generation apparatus 200, the information display apparatus 400, and the user terminal 300 are described below. FIG. 7 is a diagram illustrating examples of configurations of the image generation apparatus 200, the information display apparatus 400, and the user terminal 300. An apparatus 7000 (the user terminal 300, the image generation apparatus 200, or the information display apparatus 400) includes a controller unit 700, an operation unit 709, and a display apparatus 710.

The controller unit 700 includes a CPU 701. The CPU 701 starts an OS (OPERATING SYSTEM) using a boot program stored in a ROM 702. The CPU 701 executes, on this OS, an application program stored in an HDD (HARD DISK DRIVE) 704. The CPU 701 realized various processes by executing application programs. A RAM 703 is used as a work area of the CPU 701. The HDD 704 stores application programs and the like.

The CPU 701 is interconnected to the ROM 702, the RAM 703, an operation unit I/F 705, a display unit I/F 706, and a communication I/F 707 via a system bus 708. The operation unit I/F 705 is an interface with the operation unit 709. The operation unit I/F 705 transmits, to the CPU 701, information input by a user via the operation unit 709. The operation unit 709 includes, for example, a mouse, a keyboard, and the like. The display unit I/F 706 outputs image data to be displayed on the display apparatus 710 to the display apparatus 710. The display apparatus 710 includes a computer display. The communication I/F 707 is, for example, an Ethernet (registered trademark) interface for performing communication, and is connected to transmission cable. The communication I/F 707 inputs and outputs information from or to an external apparatus via the transmission cable. The communication I/F 707 may be a circuit or an antenna for performing wireless communication. The apparatus 7000 can also perform display control to display an image on an external display apparatus 710 connected via a cable or a network. In this case, the apparatus 7000 realizes display control by outputting display data to the display apparatus 710. Note that all of elements shown in FIG. 7 are not necessarily required in the image generation apparatus 200 or the information display apparatus 400. For example, in the image generation apparatus 200, the display apparatus 710 is not an essential element.

Figure 8:
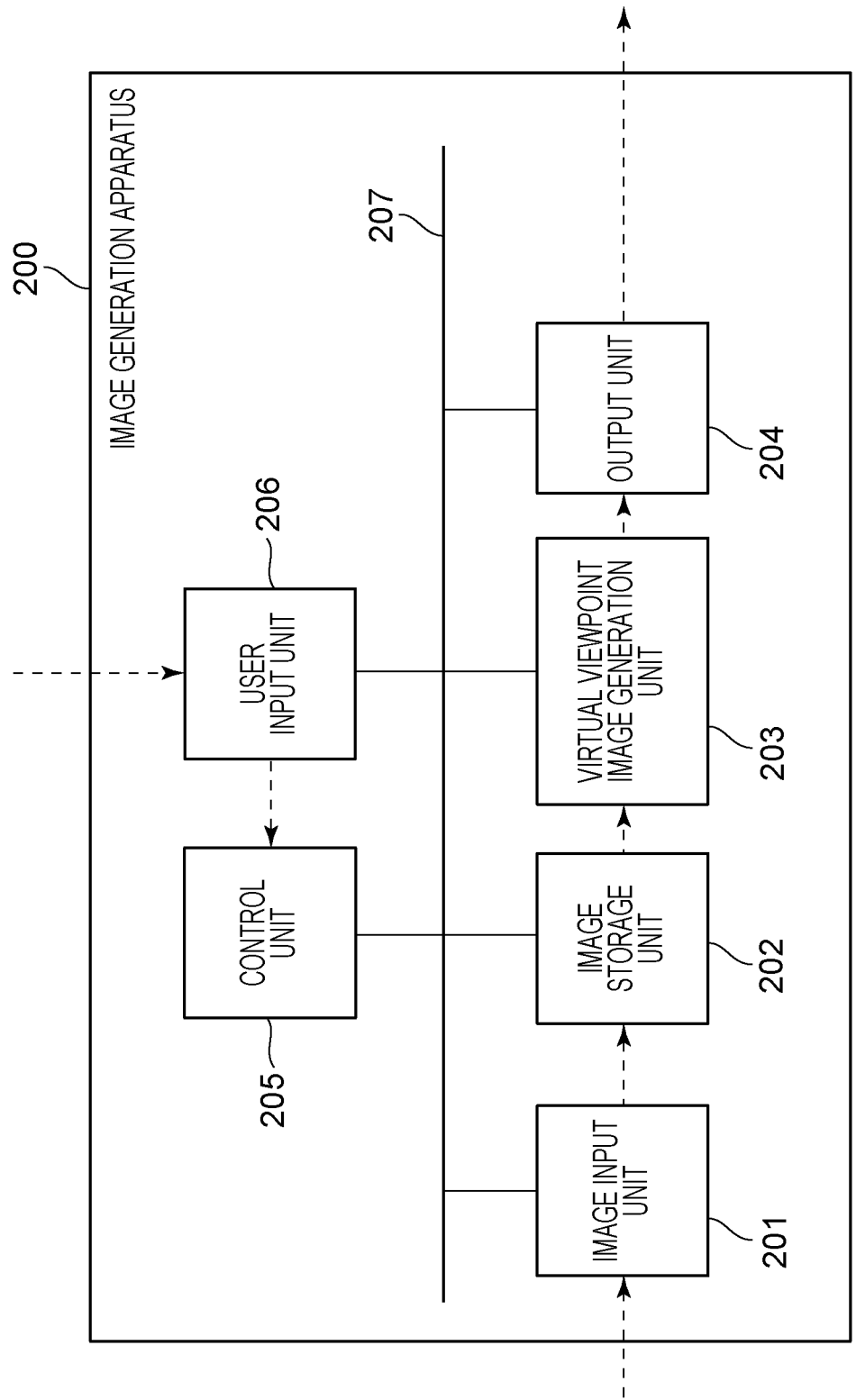
FIG. 8 is a diagram illustrating a first example of a functional configuration of an image generation apparatus.
Figure 9:
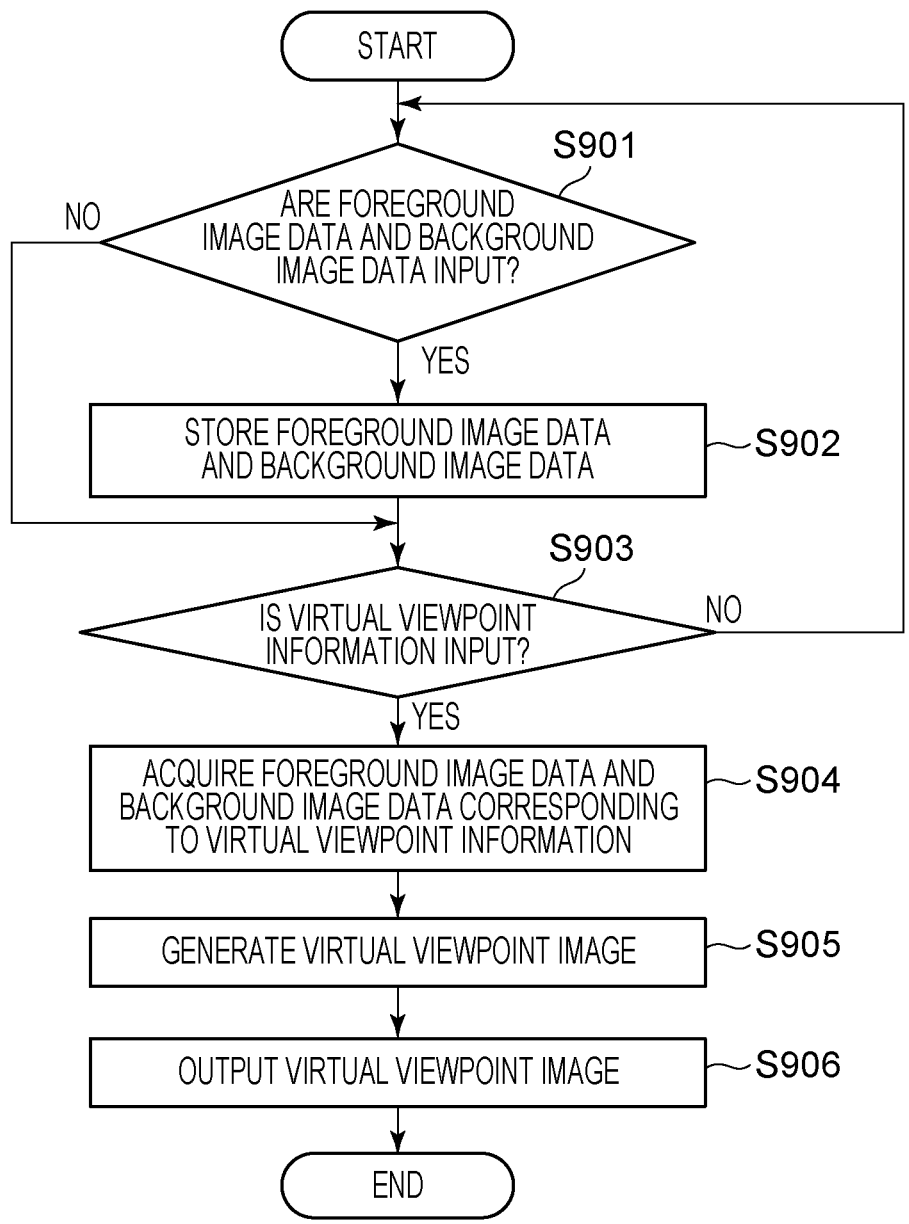
FIG. 9 is a flow chart illustrating an operation of an image generation apparatus.

FIG. 8 is a diagram illustrating an example of a functional configuration of the image generation apparatus 200 according to the present embodiment. FIG. 9 is a flow chart illustrating an example of an operation of the image generation apparatus 200 according to the present embodiment. The image generation apparatus 200 includes, as shown in FIG. 8, an image input unit 201, an image storage unit 202, a virtual viewpoint image generation unit 203, an output unit 204, a control unit 205, and a user input unit 206. These are interconnected via an internal bus 207, and can transmit and receive data mutually under the control of the control unit 205. Note that the image input unit 201 in FIG. 8 corresponds to the communication I/F 707 in FIG. 7, the user input unit 206 in FIG. 8 corresponds to the operation unit I/F 705 in FIG. 7, and the output unit 204 in FIG. 8 corresponds to the display I/F 706 and the communication I/F 707 in FIG. 7. The image storage unit 202 in FIG. 8 corresponds to the ROM 702, the RAM 703, and the HDD 704 in FIG. 7, and the control unit 205 corresponds to the CPU 701. The process shown in FIG. 9 is realized by the CPU 701 in FIG. 7 by reading out various programs stored in the ROM 702 and executing them to control various elements. An example of each element is described in detail below. Note that at least part of the steps of the flow chart in FIG. 9 may be executed by dedicated hardware. The dedicated hardware may be, for example, an ASIC or an FPGA.

The image input unit 201 inputs "foreground image data" and "background image data" output from the image capturing apparatus 100-X at different predetermined frame rates via the distribution apparatus 500 (S901). The image input unit 201 outputs the input "foreground image data" and "background image data" to the image storage unit 202. In a case where "foreground image data" and "background image data" output from the image capturing apparatus 100-X are not input, S902 is skipped and the processing flow proceeds to S903 described later.

The image storage unit 202 is a database, and stores "foreground image data" and "background image data" input from the image input unit 201 (S902). The image storage unit 202 outputs "foreground image data" and "background image data" specified by the virtual viewpoint image generation unit 203 described later to the virtual viewpoint image generation unit 203.

The virtual viewpoint image generation unit 203 determines whether virtual viewpoint information has been input from the control unit 205 (S903). An example of a method of generating virtual viewpoint information will be described later. In a case where result of the determination indicates that virtual viewpoint information is not input from the control unit 205, the processing flow returns to the S901. On the other hand, when virtual viewpoint information is input from the control unit 205, the virtual viewpoint image generation unit 203 acquires "foreground image data" and "background image data" corresponding to the virtual viewpoint information from the image storage unit 202 (S904).

Then, the virtual viewpoint image generation unit 203 generates a virtual viewpoint image by synthesizing "foreground image data" and "background image data" acquired from the image storage unit 202 by image processing, and outputs the virtual viewpoint image to the output unit 105 (S905).

As a method of generating a virtual viewpoint image, for example, model-based rendering (MODEL-BASED RENDERING: MBR) may be employed. MBR is a method of generating a virtual viewpoint image using a three-dimensional model generated based on a plurality of captured images obtained by capturing an object from a plurality of directions. Specifically, MBR is a technique of generating an image as would be seen from a virtual viewpoint using a three-dimensional shape (model) of a target scene obtained by a three-dimensional shape reconstruction method such as a visual volume intersection method or MULTI-VIEW-STEREO (MVS). The method of generating the virtual viewpoint image is not limited to the method using the MBR. For example, a rendering method other than the MBR such as image-based rendering may be used.

The output unit 204 converts the virtual viewpoint image input from the virtual viewpoint image generation unit 203 into a transmission signal that can be transmitted to the user terminal 300 and outputs the transmission signal (S906).

As described above, the user terminal 300 receives an instruction to change the position of the virtual viewpoint or the direction of the line of sight, or an instruction to switch the viewpoint, based on an operation, by a user, on a controller connected to the user terminal 300. The user terminal 300 transmits the transmission signal indicating the content of the instruction to the image generation apparatus 200. The user input unit 206 converts the transmission signal received via the user terminal 300 in the above-described manner into processable virtual viewpoint information. The user input unit 206 then outputs the virtual viewpoint information to the control unit 205.

The control unit 205 issues a control instruction to various elements of the image generation apparatus 200 based on the virtual viewpoint information given from the user input unit 206. For example, when information related to a virtual viewpoint is received from the user input unit 206, the information is transmitted to the virtual viewpoint image generation unit 203 as control information. As described above, when the virtual viewpoint information is input, the virtual viewpoint image generation unit 203 generates and outputs a virtual viewpoint image.

Note that a part of the configuration of the illustrated image generation apparatus 200 may be implemented in another apparatus. For example, the image storage unit 202 and the virtual viewpoint image generation unit 203 may be configured as separate apparatuses.

The user terminal 300 receives the position and the direction of the virtual viewpoint from the user, and displays, on a display screen of the user terminal 300, a virtual viewpoint image according to the position and the direction of the virtual viewpoint received from the user via the image generation apparatus 200. Thus, the user views the content from the viewpoint based on his/her operation. As described above, the user terminal 300 is, for example, a PC (PERSONAL COMPUTER) or a tablet device, and the controller is, for example, a mouse, a keyboard, a six-axis controller, or a touch panel. Using these, the user operates a virtual viewpoint to display a virtual viewpoint image as seen from an arbitrary viewpoint on a display screen provided on the user terminal 300.

Figure 10:
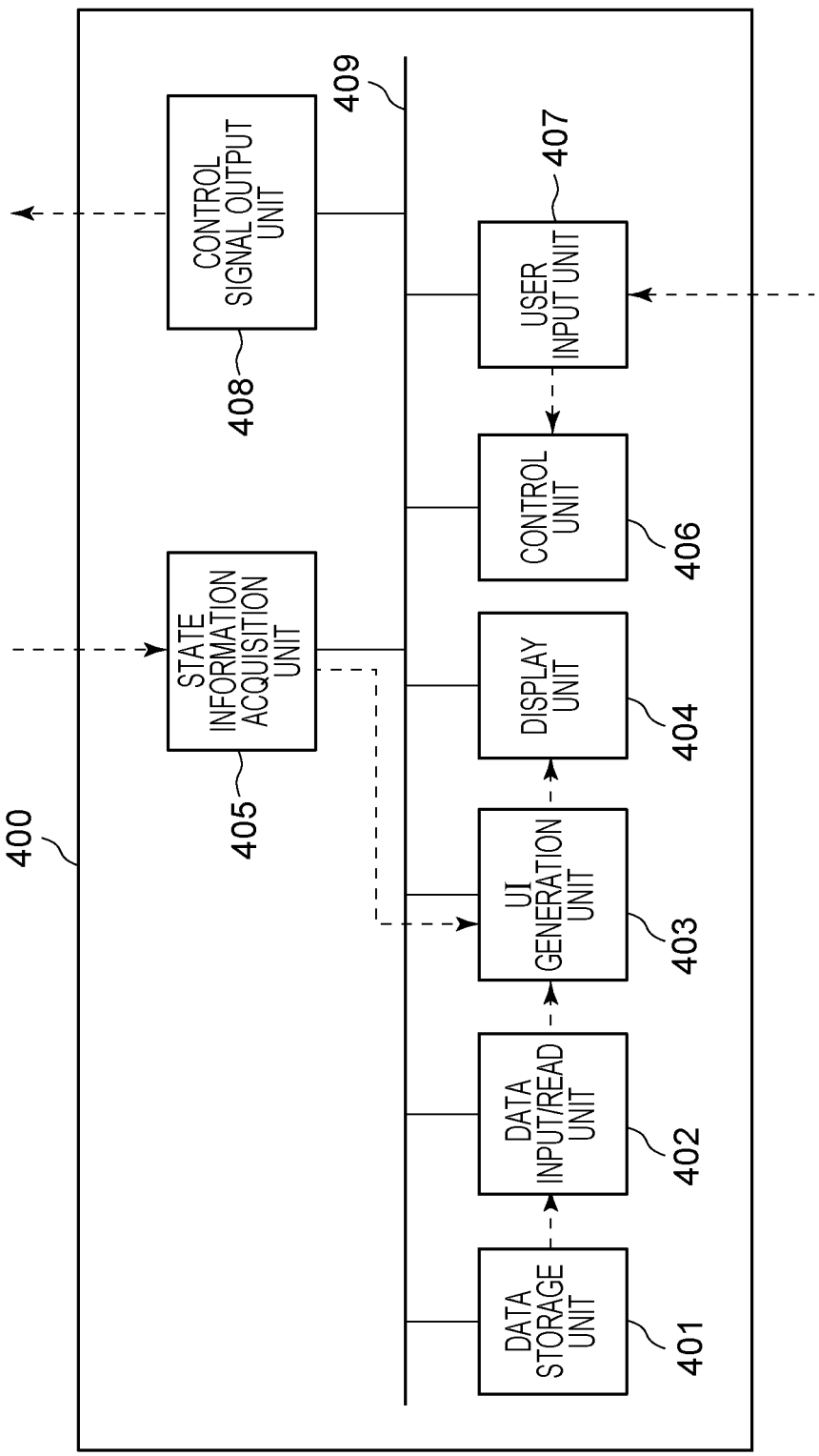
FIG. 10 is a diagram illustrating a first example of a functional configuration of an information display apparatus.
Figure 11:
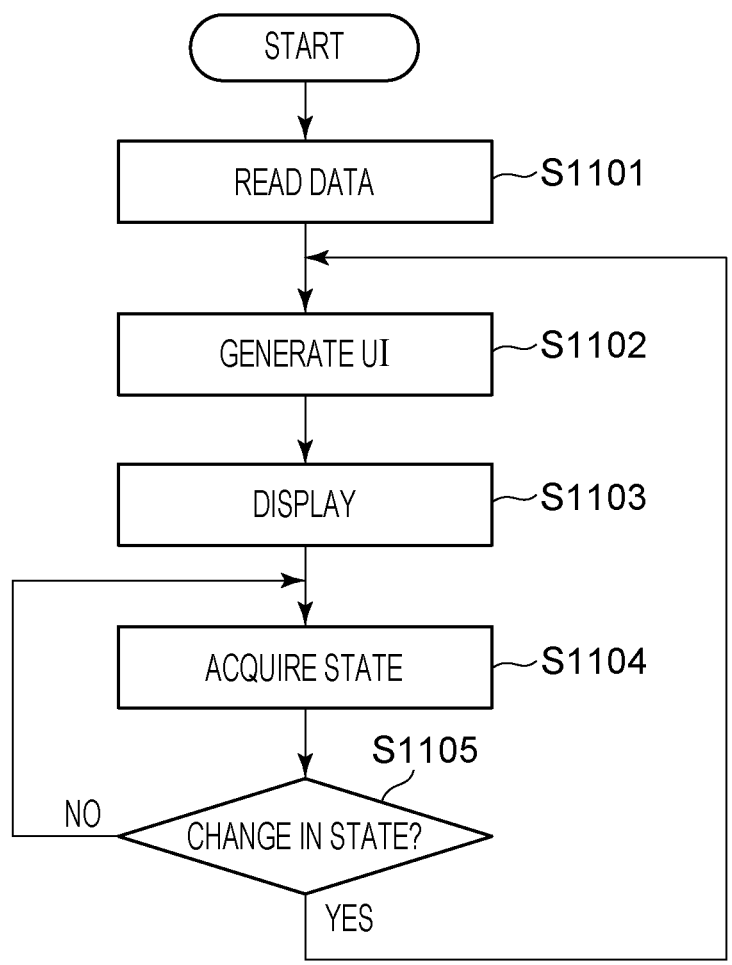
FIG. 11 is a flow chart illustrating a first example of an operation of an information display apparatus.

Next, an example of a configuration of the information display apparatus 400 is described below. FIG. 10 is a diagram illustrating an example of a functional configuration of the information display apparatus 400 according to the present embodiment. FIG. 11 is a flow chart illustrating an example of an operation of the information display apparatus 400 according to the present embodiment. The information display apparatus 400 is an example of a display apparatus that displays states of the image capturing apparatuses 100-X and/or the image generation apparatus 200 based on the information stored in the data storage unit 401 described later and the information acquired by the state acquisition unit 405. The information display apparatus 400 includes a data storage unit 401, a data reading unit 402, a UI generation unit 403, a display unit 404, a state acquisition unit 405, a control unit 406, a user input unit 407, and a control signal output unit 408. These are interconnected via an internal bus 409, and can transmit and receive data mutually under the control of the control unit 406. Note that the data storage unit 401 in FIG. 10 corresponds to the HDD 704 in FIG. 7, and the data reading unit 402, the UI generation unit 403, and the control unit 406 in FIG. 10 correspond to the CPU 701 in FIG. 7. The state acquisition unit 405 and the control signal output unit 408 in FIG. 10 correspond to the communication I/F 707 in FIG. 7, and the display unit 404 in FIG. 10 corresponds to the display I/F and the display apparatus 710. Note that the process shown in FIG. 11 and processes described later performed by the information display apparatus 400 are realized by the CPU 701 shown in FIG. 7 by reading out various programs stored in the ROM 702 and executing them to control various elements. An example of a configuration of each element is described in detail below. Note that at least part of the steps of the process shown in FIG. 11 or the processes performed by the information display apparatus 400 according to the flow charts described later may be executed by dedicated hardware. The dedicated hardware may be, for example, an ASIC or an FPGA.

The data storage unit 401 stores data necessary for the UI generation unit 403 to display the UI. The data includes at least one of the following:

Layout data of the stadium 210
Identification information identifying the image capturing apparatus 100-X
Connection group information on a group to which the image capturing apparatus 100-X belongs
Connection destination of the image capturing apparatus 100-X
Installation area of the image capturing apparatus 100-X
Installation coordinate information of the image capturing apparatus 100-X
Imaging target area to be captured by the image capturing apparatus 100-X
Center coordinate information of the imaging target area to be captured by the image capturing apparatus 100-X
Effective area information of the imaging target area to be captured by the image capturing apparatus 100-X
Area information of the installation area of the image capturing apparatus 100-X FIG. 12 illustrates an example of data stored in the data storage unit 401. In the data shown in FIG. 12, for example, "image capturing apparatus 100-1" belongs to a communication connection group named "L1", and it is interconnected with "image capturing apparatus 100-2" and is installed at coordinates (x1, y1) in an area named "R1". The installation coordinate information is XY coordinate information in which a predetermined position (for example, the center of the stadium 210) is set as the origin.

FIG. 13 illustrates another example of data stored in the data storage unit 401. The area center coordinates (information indicating the coordinates of the center of the imaging target area shown in FIG. 12) are XY coordinate information in which a predetermined position (for example, the center of the stadium 210) is set as the origin. Note that a group of image capturing apparatuses 100-X that capture images of a common imaging target area is set such that the optical axis thereof is directed to the position indicated by the area center coordinates. That is, the center of the image captured by any one of the image capturing apparatuses 100-X capturing the same imaging target area is at the position indicated by the same area center coordinates for any image capturing apparatuses 100-X. The effective area information indicates an area defined by a radius from the center coordinates. The virtual viewpoint image is generated using images captured by the image capturing apparatuses 100-X that capture a common imaging target area.

FIG. 14 illustrates another example of data stored in the data storage unit 401. Vertex coordinates include coordinate information of at least three or more vertices, and an area surrounded by these coordinate information is the area of the installation area.

The data storage unit 401 may acquire these pieces of information via an input operation performed by a user, or may acquire them based on the state information given from the image capturing apparatuses 100-X. Note that the data storage unit 401 does not need to be disposed in the information display apparatus 400, but may be disposed in an external storage apparatus. The data storage unit 401 that stores information related to the image capturing apparatus 100-X may be disposed individually in each image capturing apparatus 100-X.

The data reading unit 402 reads various data from the data storage unit 401 and outputs the data to the UI generation unit 403 (S1101). The UI generation unit 403 generates a UI image, which is information indicating the state of the system or the image capturing apparatus 100-X, based on the data output from the data reading unit 402 and the state information output from the state acquisition unit 405 (S1102). Note that the state information and examples of UI images will be described later. The UI generation unit 403 outputs the generated UI image as a display image to the display unit 404.

The display unit 404 includes a frame buffer and a display panel. The display unit 404 stores (overwrites) the display image output from the UI generation unit 403 in the frame buffer. The display unit 404 reads out the display image stored in the frame buffer at a predetermined refresh rate and displays the read image on the display panel (S1103). The display panel is, for example, a liquid crystal panel or an organic EL panel.

The state acquisition unit 405 acquires state information of each image capturing apparatus 100-X and state information of the image generation apparatus 200, and outputs the state information to the UI generation unit 403. When a change has occurred in the state information, the UI generation unit 403 updates the generated UI image (S1104, S1105).

The control unit 406 issues a control instruction to various units of the information display apparatus 400 based on the operation information given via the user input unit 407. For example, when the control unit 406 receives operation information indicating an instruction to switch the display image type from the user input unit 407, the control unit 406 converts the operation information into a corresponding display image type and transmits it to the UI generation unit 403. An example of the specific content of the display image will be described later.

The user input unit 407 receives operation information input from a controller (not shown) and outputs the operation information to the control unit 406. The controller is, for example, at least one of a keyboard, a mouse, and a touch panel. The control signal output unit 408 outputs a control signal given from the control unit 406 to the outside. The output destination is, for example, the image capturing apparatus 100-X. The control signal is, for example, a signal for setting imaging parameters in terms of zoom, focus, iris, ISO, shutter speed, ND filter switching, and the like, of the image capturing apparatus 100-X.

Description of Displaying of Stadium Layout

Figure 15:
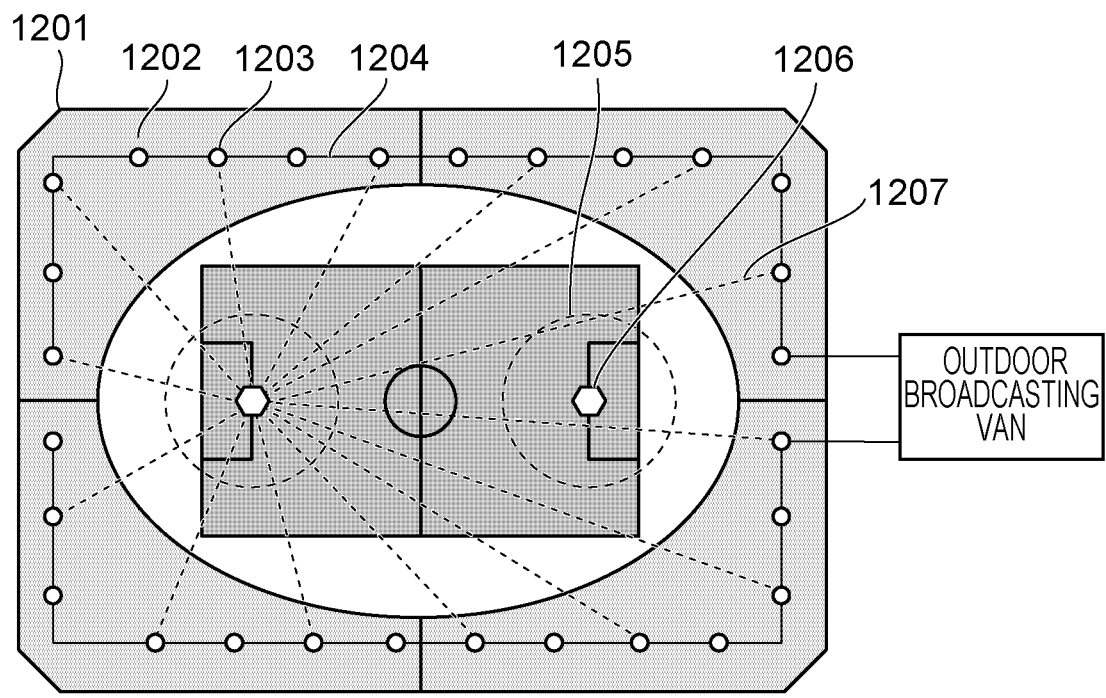
FIG. 15 is a diagram illustrating an example of a display image displayed by an information display apparatus.

FIG. 15 is a diagram illustrating an example of a display image displayed by the information display apparatus 400 according ding to the present embodiment. In FIG. 15, information described below is displayed on information (1201) indicating the stadium 210.

Installation area where the image capturing apparatus 100-X is installed (for example, an area denoted by 1202)

Image capturing apparatus 100-X and its installation position (for example, circles denoted by 1203)

Connection relationship and connection state among image capturing apparatuses 100-X (for example, a line denoted by 1204)

Imaging target area (for example, a dashed circular area denoted by 1205)

Center point of a imaging target area (for example, a hexagon denoted by 1206)

Imaging target area to be captured by the image capturing apparatus 100-X (for example, a dotted line denoted by 1207)

In FIG. 15, the information display apparatus 400 displays the connection state between the image generation apparatus 200 or the information display apparatus 400 and the image capturing apparatus 100-X. Note that depending on a situation, the information display apparatus 400, the image generation apparatus 200, and/or the like may be installed in an outdoor broadcasting van or the like located outside the stadium, and thus in FIG. 15, the information display apparatus 400, the image generation apparatus 200, and/or the like are described as an outdoor broadcasting van.

The information display apparatus 400 displays information in the manner as shown in FIG. 15, and thus a user can grasp, at a glance, the displayed information related to an image capturing system including a plurality of image capturing apparatuses. Furthermore, the information display apparatus 400 is capable of displaying where the respective image capturing apparatuses are located and how they are connected to each other. Furthermore, for example, when a communication error occurs in a communication path line 1204, the information display apparatus 400 hides this line 1204. Furthermore, for example, the information display apparatus 400 displays information such that a circle 1203 indicating an image capturing apparatus 100-X capable of capturing an image is distinguished from a circle 1203 indicating an image capturing apparatus 100-X which is in a failure state or in adjustment operation and thus which is not capable of capturing an image. The information display apparatus 400 may hide a circle 1203 corresponding to an image capturing apparatus 100-X which is in the state in which it is not capable of capturing an image. The information display apparatus 400 may display an error when data stored in the data storage unit 401 is not consistent with data indicated by the state information acquired from the image capturing apparatus 100-X. For example, when a connection relation among image capturing apparatuses 100 stored in the data storage unit 401 is different from an actual connection relation among the image capturing apparatuses 100-X indicated by the state information, a warning is displayed. This makes it possible for a user to easily identify an image capturing apparatus having a failure, and to easily grasp where it is located. The information display apparatus 400 displays information indicating an imaging target area of each of the plurality of image capturing apparatuses, and thus it is possible for a user to grasp a position of a virtual viewpoint that has a problem when an image capturing apparatus has a failure. The information display apparatus 400 displays information indicating the imaging target area of each of the plurality of image capturing apparatuses, and thus it is possible for a user to determine whether or not the image capturing system can capture images from which to generate a correct virtual viewpoint image.

Note that the information display apparatus 400 does not have to display all information shown by way example in FIG. 15, but may display only a part of the information. That is, the information display apparatus 400 may display at least one of a plurality of types of information including information on installation positions of the image capturing apparatuses 100-X, information on a communication connection among the image capturing apparatuses 100-X, and information on imaging target areas of the image capturing apparatuses 100-X. For example, by displaying information indicating installation positions of the image capturing apparatuses 100-X, the information display apparatus 400 of the image capturing system 100 can make a user easily grasp in which area and how a plurality of image capturing apparatuses of the image capturing system 100 are disposed. Furthermore, the information display apparatus 400 can allow the user to easily grasp the network configuration by displaying the information related to the communication connection among the image capturing apparatuses. By displaying information related to the communication connection among the image capturing apparatuses 100-X, it becomes possible for a user, when a network failure occurs, to easily identify an image capturing apparatus 100-X that is influenced by the failure, and immediately take action such as repairing. Furthermore, the information display apparatus 400 can allow a user to easily grasp an imaging region aimed at by each of the plurality of image capturing apparatuses of the image capturing system 100 by displaying the information on the imaging target areas of the image capturing apparatuses 100-X. Displaying information on the imaging target areas of the image capturing apparatuses 100-X makes it possible for a user to easily determine whether multi-viewpoint imaging from various angles necessary for generating a virtual viewpoint image is being performed well.

Figure 16:
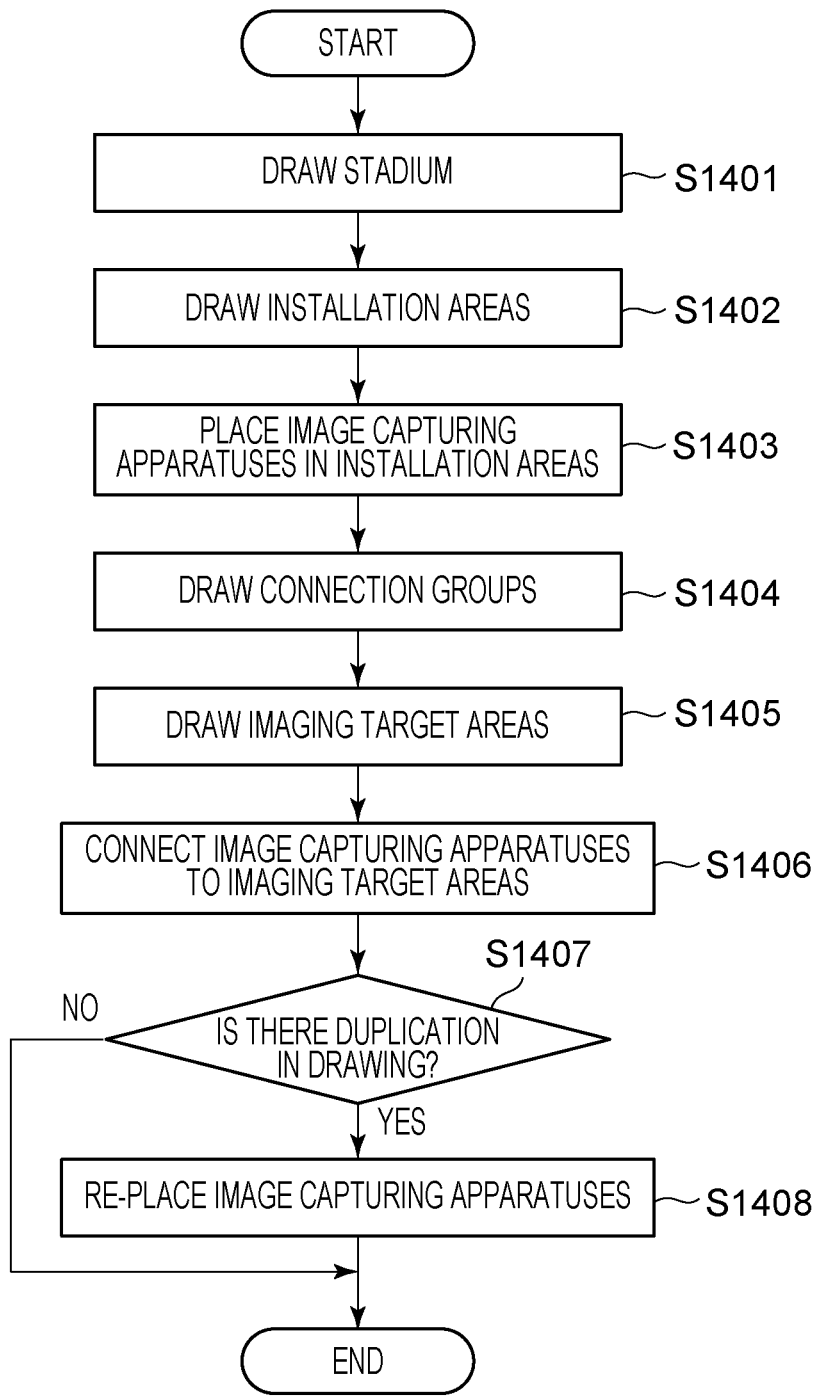
FIG. 16 is a flow chart illustrating a process performed by a UI generation unit of an information display apparatus.

FIG. 16 illustrates a processing flow performed by the UI generation unit 403 of the information display apparatus 400 to generate the display image in FIG. 15. FIGS. 17 to 22 illustrate specific display images drawn by each process in the flow. Note that the processing order is not limited to the example shown in FIGS. 17 to 22. The process shown in FIG. 16 and displaying processes described later are realized by the CPU 701 in FIG. 7 by reading out various programs stored in the ROM 702 and executing them to control various elements. An example of a configuration of each element is described in detail below. Note that at least part of the steps of the flow chart in FIG. 16 or displaying processes described later may be executed by dedicated hardware. The dedicated hardware may be, for example, an ASIC or an FPGA.

Figure 17:
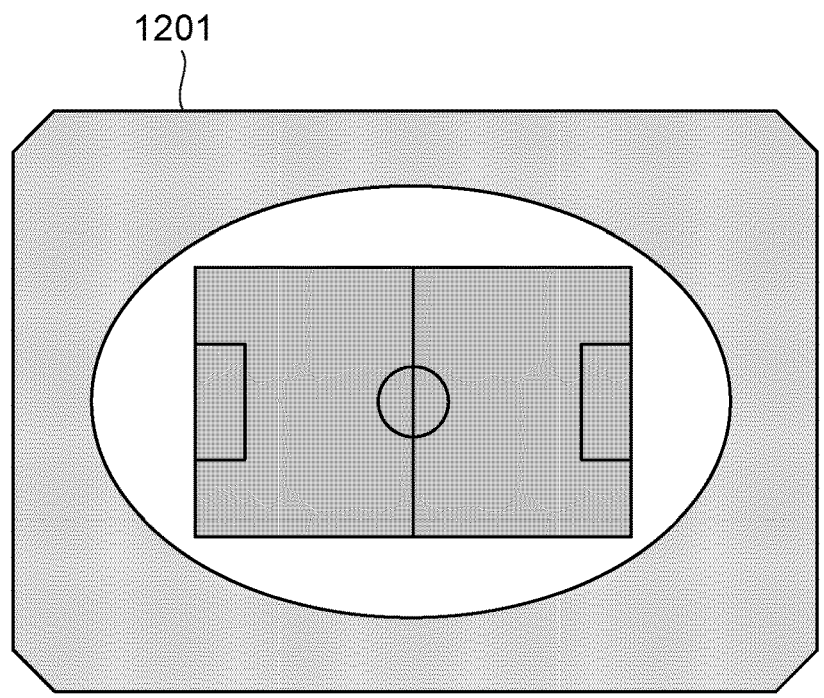
FIG. 17 is a diagram illustrating an example of a display image generated by a UI generation unit of an information display apparatus.
Figure 18:
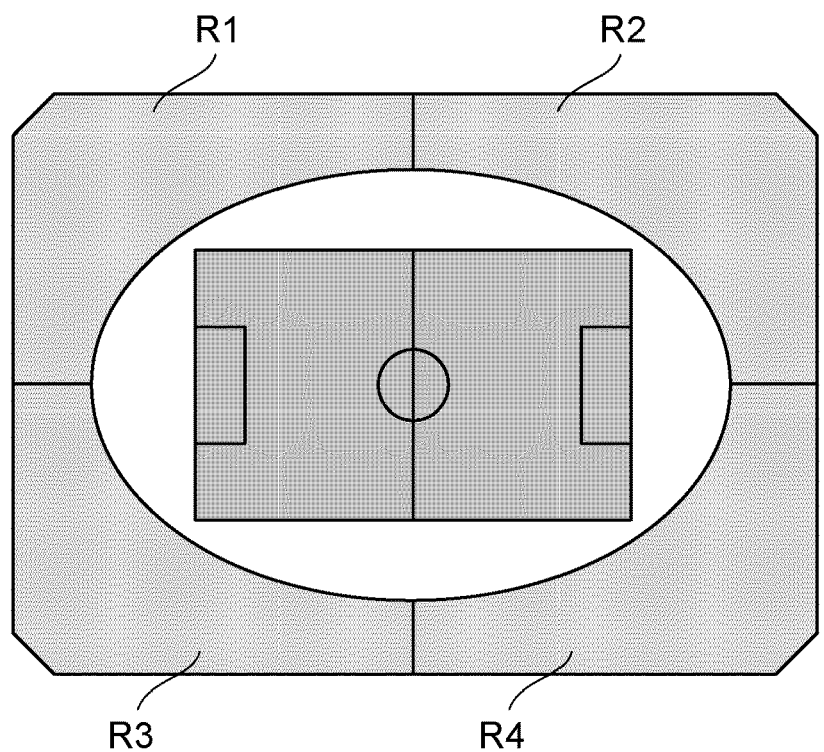
FIG. 18 is a diagram illustrating an example of a display image generated by a UI generation unit of an information display apparatus.
Figure 19:
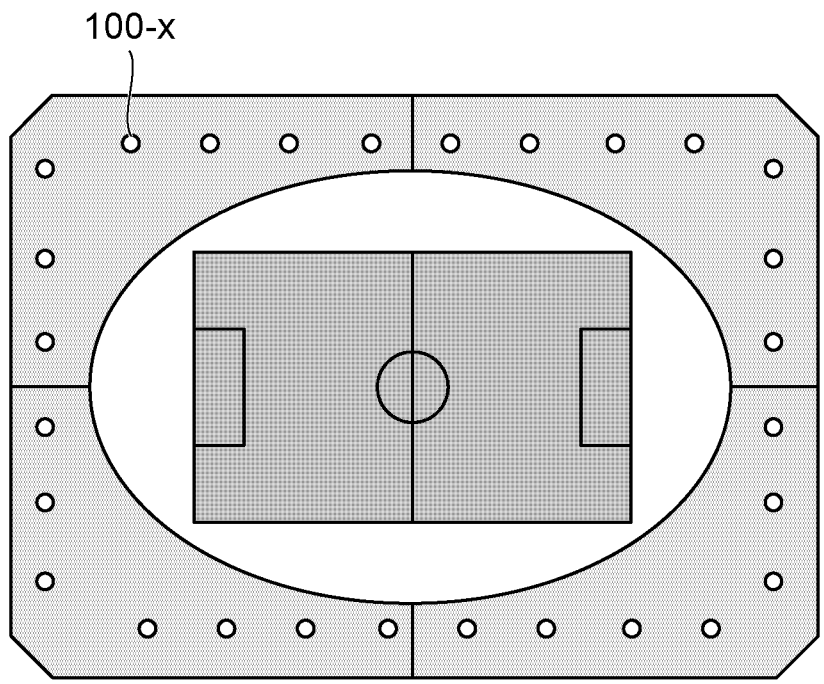
FIG. 19 is a diagram illustrating an example of a display image generated by a UI generation unit of an information display apparatus.
Figure 20:
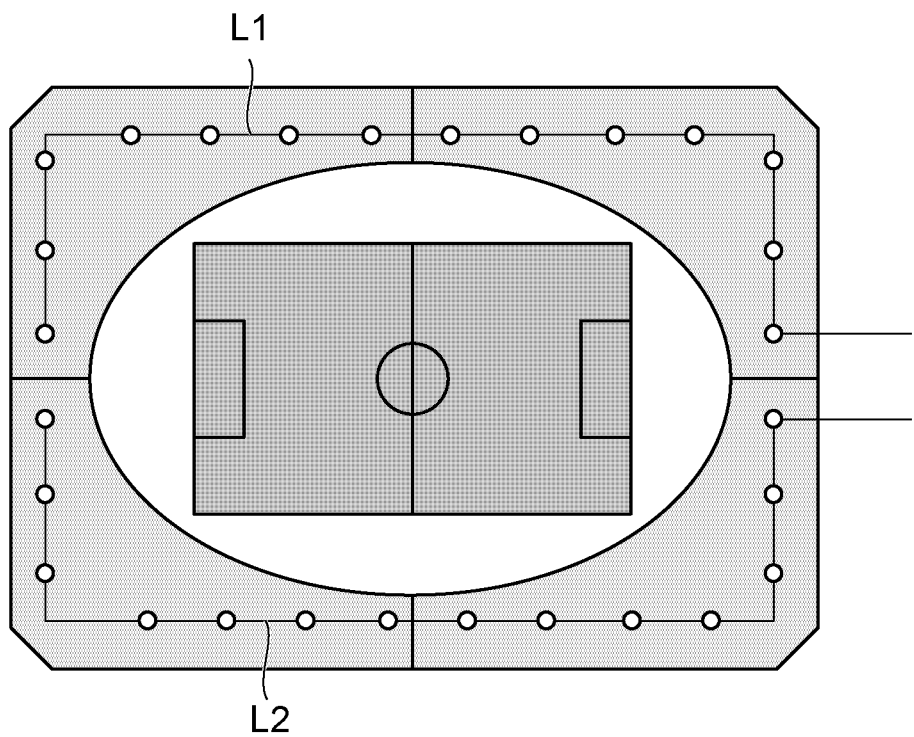
FIG. 20 is a diagram illustrating an example of a display image generated by a UI generation unit of an information display apparatus.
Figure 21:
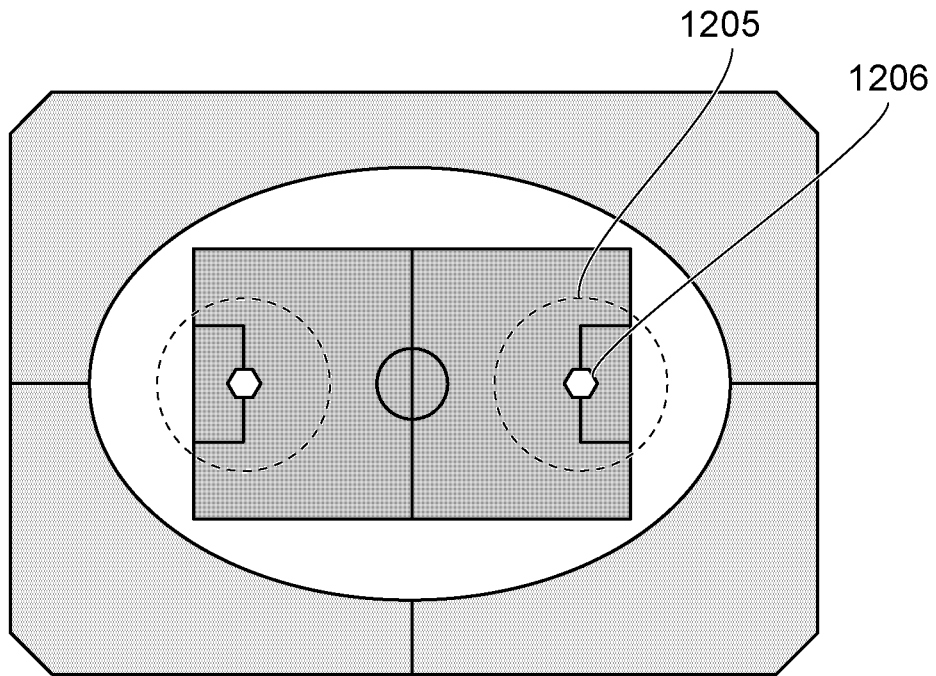
FIG. 21 is a diagram illustrating an example of a display image generated by a UI generation unit of an information display apparatus.

The UI generation unit 403 draws the layout data of the stadium 210 output from the data reading unit 402 (S1401, FIG. 17). The UI generation unit 403 draws the layout data of the stadium 210 output from the image capturing apparatus 100-X (S1402, FIG. 18). In the present example, there are four installation areas (R1, R2, R3, and R4). These areas are based on the coordinate information shown in FIG. 14. Thereafter, the UI generation unit 403 places the image capturing apparatuses 100-X in the respective belonging installation areas (S1403, FIG. 19). These are based on the installation area and the installation coordinate information shown in FIG. 12. Thereafter, the UI generation unit 403 draws the connection relationship among the image capturing apparatuses 100-X (S1404, FIG. 20). In this example, there are two connection groups (L1, L2). These are based on the connection group information and the connection destination information shown in FIG. 12. The UI generation unit 403 may dynamically generate a display image indicating network connection of the image capturing system 100 based on the state information acquired from the image capturing system 100. The UI generation unit 403 may display an error when the generated network connection of the image capturing system 100 is different from the correct network configuration stored in advance. Thereafter, the UI generation unit 403 draws areas to be imaged by the respective image capturing apparatuses 100-X (S1405, FIG. 21). In the present example, there are two imaging target areas. Each of these has the center point (1206) of the imaging area and the effective area (1205) of the imaging area. The effective area indicates an area suitable for generating a virtual viewpoint image. These are based on the information shown in FIG. 13. Note that as described later, the images shown in FIGS. 17 to 22 are drawn in different layers. Thereafter, the UI generation unit 403 connects these using a line functioning as information indicating an association between each image capturing apparatus 100-X and the imaging target area (S1406, FIG. 22). In a case where there are a large number of image capturing apparatuses 100-X in the same area, then, as shown in FIG. 23A, there is a possibility that a line (1207-2) between an image capturing apparatus 100-X (1203-2) and an imaging target area intersects with another image capturing apparatus 100-X (1203-1). The UI generation unit 403 checks whether such an intersection occurs (S1407). When an intersection is detected, the UI generation unit 403 rearranges the drawing position of the image capturing apparatus 100-X having the intersection to a position in the same area such that no intersecting occurs (1408). That is, the information display apparatus 400 controls displaying such that no intersection occurs between lines connecting information indicating image capturing apparatuses 100-X and the central point of the imaging target area. This makes it possible for a user to easily know the imaging target area of each image capturing apparatus 100-X. However, the position of the image capturing apparatus 100-X may not be moved.

Displaying Layers and Switching Display by User Operation

When the UI generation unit 403 draws a display image according to the process flow shown in FIG. 16, the display image is divided into layers based on the information in FIGS. 12 to 14. Note that layers are a plurality of storage areas having the same size as the frame buffer included in the UI generation unit 403, and more specifically the layers are formed in part of the RAM 703 in FIG. 7. The UI generation unit 403 generates the display image shown in FIG. 15 by superimposing a plurality of drawing layers.

Specifically, the following are drawn in respective drawing layers.

Figure 22:
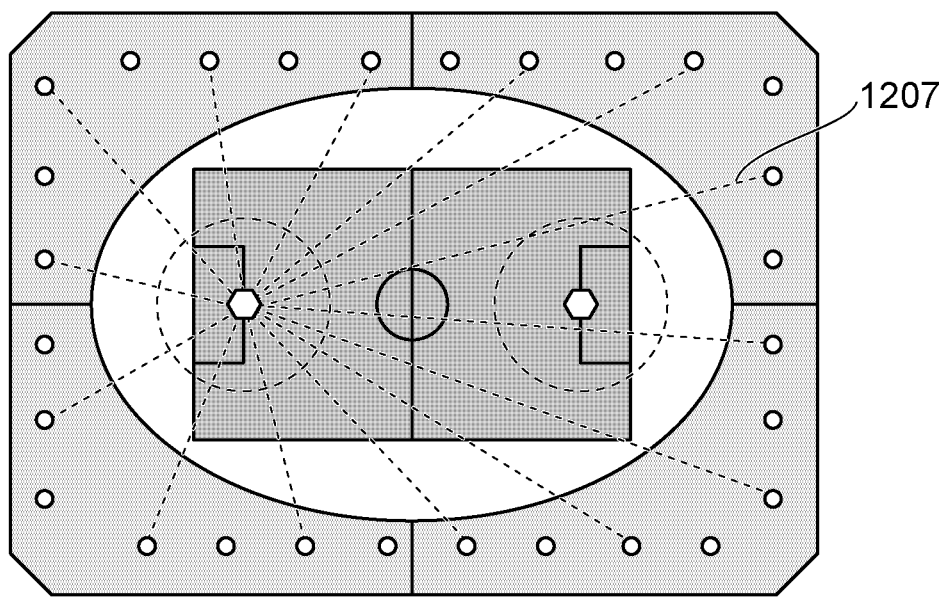
FIG. 22 is a diagram illustrating an example of a display image generated by a UI generation unit of an information display apparatus.
Figure 23A:
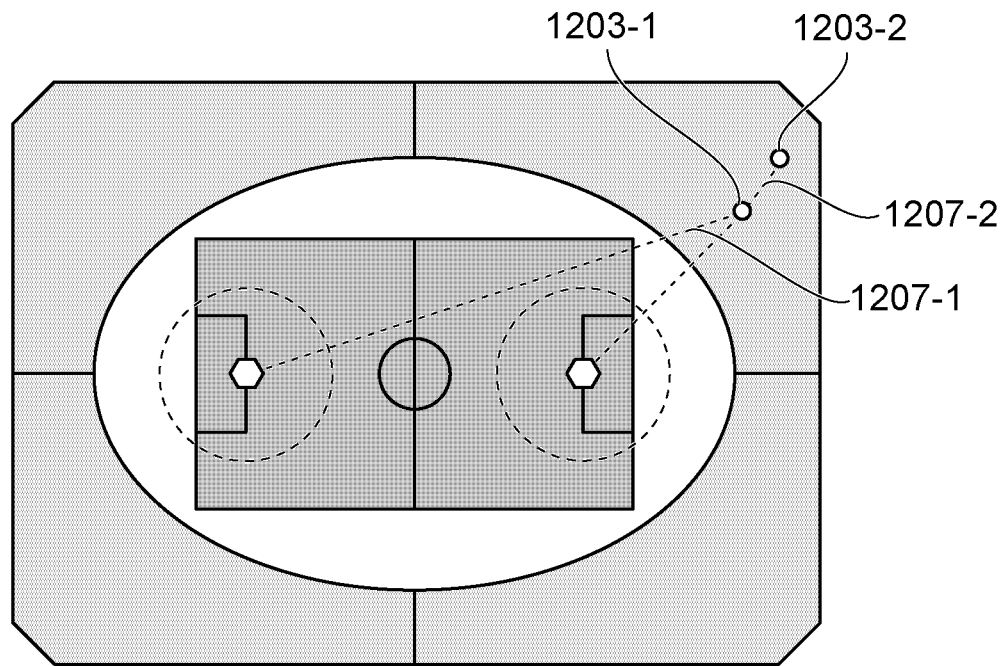
FIG. 23A is a diagram illustrating an example of a display image indicating a process performed by a UI generation unit of the information display apparatus.
Figure 23B:
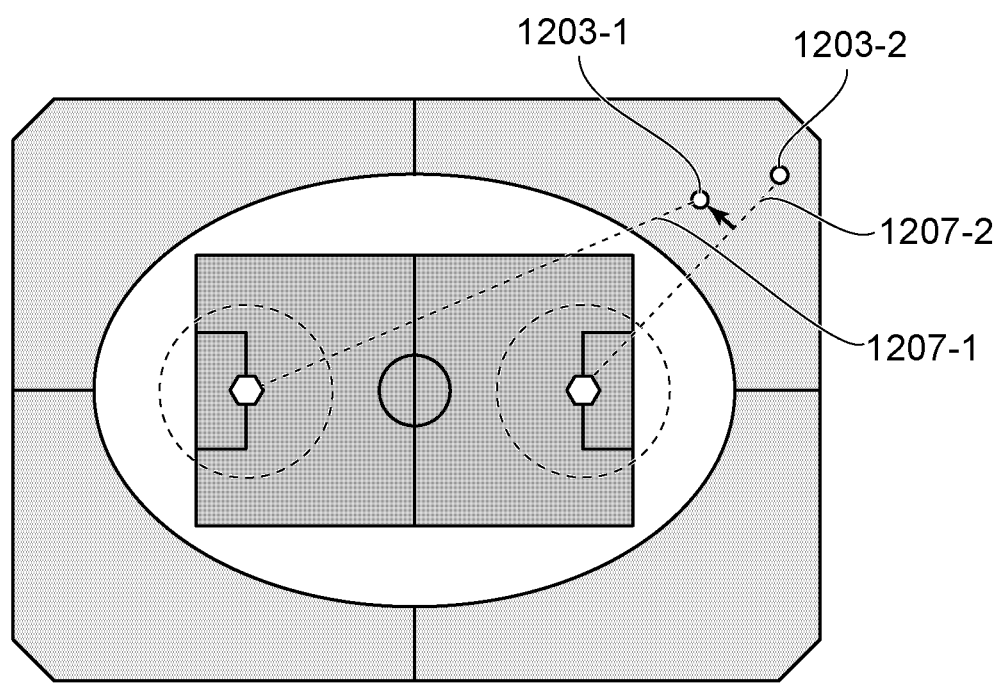
FIG. 23B is a diagram illustrating an example of a display image indicating a process performed by a UI generation unit of the information display apparatus.

Stadium 210 (S1401, illustrated in FIG. 17)
Each area (S1402, illustrated in FIG. 18)
Each image capturing apparatus 100-X (S1403, illustrated in FIG. 19)
Each connection area (S1404, illustrated in FIG. 20)
Each imaging target area (S1405, illustrated in FIG. 21)
Line connecting between image capturing apparatuses 100-X and imaging target areas (S1406, illustrated in FIG. 22)

As described above, there area four installation areas of the image capturing apparatuses according to the present embodiment, that is, R1, R2, R3, and R4. Therefore, in S1402, four layers are used. There are two connection groups L1 and L2. Therefore, in S1403, two layers are used.

Figure 24:
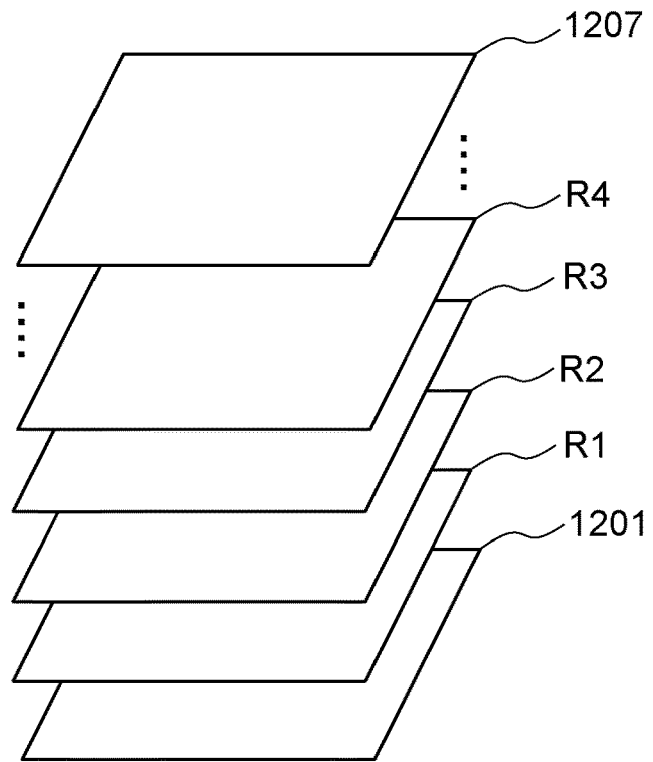
FIG. 24 is a diagram illustrating an example of a layer drawing process performed by a UI generation unit of an information display apparatus.

FIG. 24 shows an example of an image of layer drawing processing performed by the UI generation unit 403. The stadium 210 corresponding to 1201 in FIG. 17 is drawn in a lowest layer, and layers of respective areas are overlaid on it. Connections between the respective image capturing apparatuses 100-X and the corresponding minimum imaging areas are drawn in a layer and overlaid on the top. The order of superposition of the layers may be changed properly. Note that it is not always necessary to overlap a plurality of layers. For example, a display image such as that shown in FIG. 15 may be generated by adding contents shown in FIGS. 18 to 22 to the image shown in FIG. 17. However, drawing a plurality of layers separately makes it possible to easily switch a display image. A further detailed description is given below.

Figure 25:
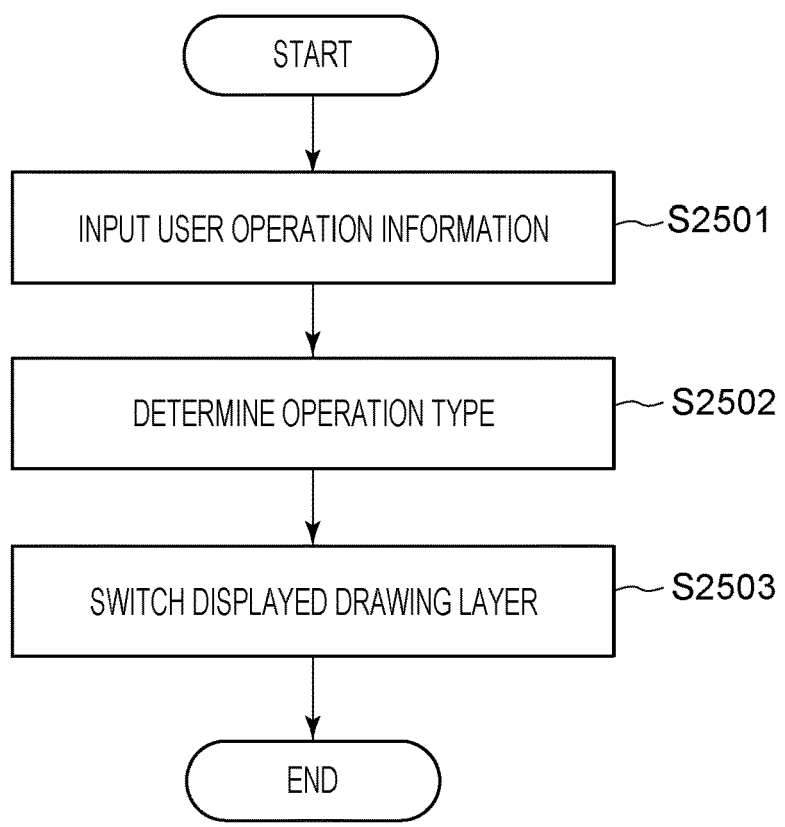
FIG. 25 is a flow chart illustrating a process performed by an information display apparatus.

FIG. 25 illustrates a processing flow of switching the display image drawn in FIG. 15 according to operation information input via the user input unit 407. When operation information is input via a controller such as a keyboard, the user input unit 407 outputs the information to the control unit 406 (S2501). When the control unit 406 receives the operation information, the control unit 406 determines a content to be displayed or not displayed based on the operation information, and outputs a display switching instruction indicating the determination on the content to the UI generation unit 403 (S2502). The control unit 406 stores in advance contents to be displayed or not displayed for each piece of operation information.

For example, when a key "A" is pressed on the keyboard, operation information has a content indicating that cameras belonging to a connection group L1 are to be displayed. When the UI generation unit 403 receives the display switching instruction, the UI generation unit 403 adds or deletes a corresponding drawing layer, and superimposes remaining drawing layers. The UI generation unit 403 outputs the result to the display unit 404 (S2503).

Figure 26:
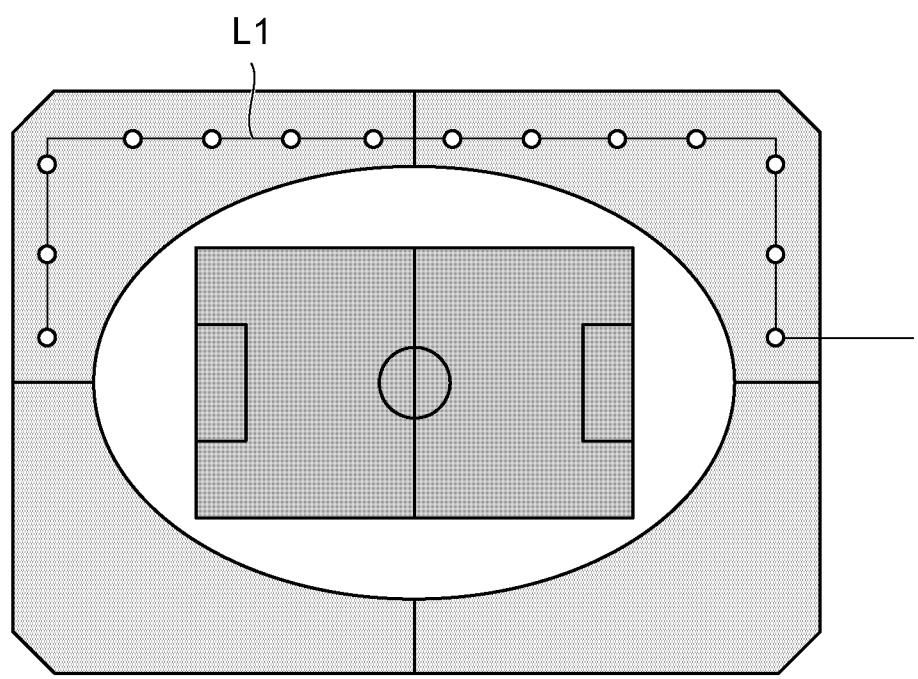
FIG. 26 is a diagram illustrating an example of a display image of display switching of a UI generation unit of an information display apparatus.

FIG. 26 illustrate an example of a UI image obtained as a result of the processing shown in FIG. 25. This is the result of performing display switching so as to display only image capturing apparatuses 100-X belonging to the connection group L1. The process shown in FIG. 25 may control the information display apparatus 400 to display information on only image capturing apparatuses 100-X installed in the area R1. The process in FIG. 25 may control the information display apparatus 400 to display information on only an arbitrary image capturing apparatus 100-X. The process in FIG. 25 may control the information display apparatus 400 to display information on only image capturing apparatuses 100-X in which a common imaging target area is set.

In the examples described above it is assumed by way of example that a user selects layers to be displayed. However, the present invention is not limited to this, and the information display apparatus 400 may automatically select layers to be displayed. For example, when the information display apparatus 400 receives information indicating that at least one of apparatuses in the system is in a state in which a problem may occur in producing a virtual viewpoint image, the information display apparatus 400 may pop up a warning. In this case, as well as popping up the warning, the information display apparatus 400 may automatically select and display a layer suitable for displaying the state in which the apparatus has the problem causing it to be difficult to produce the virtual viewpoint image. This make it possible for a user to understand that there is a possibility that degradation in quality or other problems may occur in a virtual viewpoint image and to take action.

As described above, the information display apparatus 400 properly combines or deletes layers in displaying the state of the image capturing system. Therefore, even when the image capturing system has many image capturing apparatuses, the information display apparatus 400 is capable of displaying only the state of a desired image capturing apparatus group, which makes it possible to provide better visibility. Furthermore, as well as drawing an image on a layer-by-layer basis, the UI generation unit 403 is capable of changing a background color of each layer. For example, when the information display apparatus 400 is disposed in an outdoor broadcasting van in which illuminance is low, the background color can be black-based to improve visibility. In a case where the information display apparatus 400 is disposed in an outdoor circumstance where illuminance is high, a white-based background may be employed to ensure good visibility. Although in the examples described above, it is assumed by way of example that a layer is to be displayed is selected, all or part of the information shown in FIG. 15 may be fixedly displayed without performing selection.

Description of Displaying States of Image Capturing Apparatuses 100-X

Figure 27A:
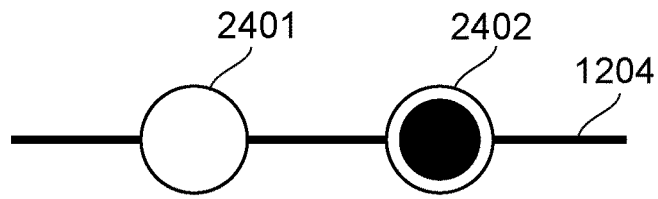
FIG. 27A is a diagram illustrating an example indicating a state of an image capturing apparatus on a display image.

FIG. 27 shows an example of a state of an image capturing apparatus 100-X displayed on the display image shown in FIG. 15. When the state acquisition unit 405 of the information display apparatus 400 acquiring state information on an image capturing apparatus 100-X from the state information storage unit 104 of the image capturing apparatus 100-X, the state acquisition unit 405 outputs the state information to the UI generation unit 403. The UI generation unit 403 updates the display of the image capturing apparatus 100-X on the display image in FIG. 15 based on the state information. More specifically, in the example shown in FIG. 27, part of an image capturing apparatuses 100-X on a certain connection group (1204) is displayed. For example, the states of the image capturing apparatuses 100-X that may be displayed includes the following:

State in which an image capturing apparatuses 100-X is communicably connected with the information display apparatus 400 or another image capturing apparatus 100-X (2401 in FIG. 27A)

State in which an image capturing apparatuses 100-X is not communicably connected with the information display apparatus 400 or another image capturing apparatus 100-X (2402 in FIG. 27A)

In addition to the states shown in FIG. 27A, the information display apparatus 400 also displays the state of the image capturing apparatus 100-X itself.

Figure 27B:
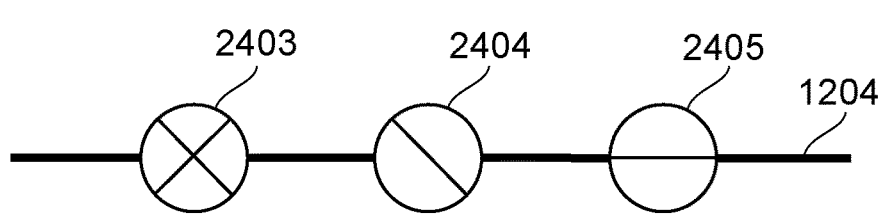
FIG. 27B is a diagram illustrating an example indicating a state of an image capturing apparatus on a display image.

The image capturing apparatus 100-X is in an error state (2403 in FIG. 27B)

The image capturing apparatus 100-X is in a warning state (2404 in FIG. 27B)

The image capturing apparatus 100-X is in a bypassed state (2405 in FIG. 27B)

The error state is a state in which an abnormality occurs in temperature inside the image capturing apparatus 100-X or the optical lens. The error state may be a state in which the image capturing apparatus 100-X can not perform imaging or a problem may occur in imaging. The warning state is a state in which an error state is likely to occur, although there is no problem in operation but an increase has occurred in temperature by a particular amount or a deviation has occurred in synchronization with an external synchronization apparatus (not shown) by a particular amount. The bypassed state is a state in which the image capturing apparatus 100-X is not used but only the connection state thereof is maintained. The bypassed state may be a state in which the image capturing apparatus 100-X is not allowed to execute imaging or image processing, and only performs data transmission.

In addition to the states shown in FIGS. 27A and 27B, the information display apparatus 400 also displays configuration states of the image capturing apparatus 100-X.

Figure 27C:
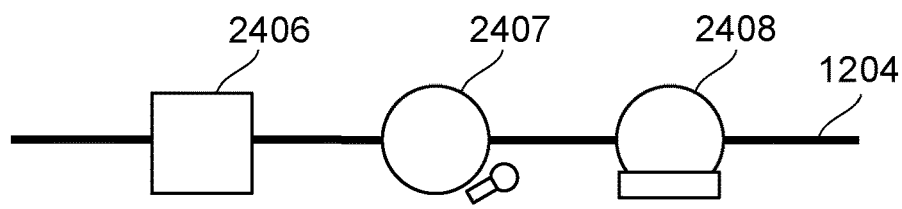
FIG. 27C is a diagram illustrating an example indicating a state of an image capturing apparatus on a display image.

A zoom lens is attached to the image capturing apparatus 100-X (2406 in FIG. 27C)

A sound collection microphone is attached to the image capturing apparatus 100-X (2407 in FIG. 27C)

A camera platform is attached to the image capturing apparatus 100-X (2408 in FIG. 27C)

Furthermore, in addition to the states shown in FIGS. 27A, 27B and 27C, the information display apparatus 400 also displays the output states of the image capturing apparatuses 100-X.

Figure 27D:
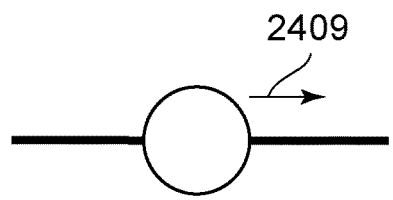
FIG. 27D is a diagram illustrating an example indicating a state of an image capturing apparatus on a display image.

"Foreground image data" and "background image data" captured by the image capturing apparatus 100-X are being output to the image generation apparatus 200 and the information display apparatus 400 at a predetermined frame rate via the distribution apparatus 500 (2409 in FIG. 27D).

In a case where there are a plurality of output destinations to which the image capturing apparatuses 100-X output data and/or there are a plurality of output frame rates, the information display apparatus 400 may display information indicating these. The information display apparatus 400 may display information related to quality of an image output by the image capturing apparatus 100-X (such as a data size, an image size, a file format, etc.).

In addition to the states shown in FIGS. 27A, 27B, 27C, and 27D, the information display apparatus 400 also displays mechanical states of the image capturing apparatuses 100-X.

Figure 27E:
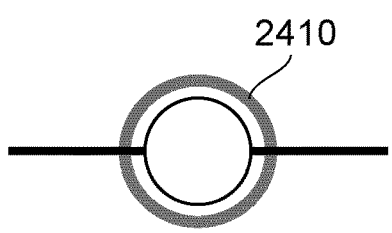
FIG. 27E is a diagram illustrating an example indicating a state of an image capturing apparatus on a display image.

The zoom lens of the image capturing apparatus 100-X is in operation (2410 in FIG. 27E)

The states also include a camera platform operation and an autofocus operation.

Examples of displayed states of the image capturing apparatus 100-X have been described above. However, the displayed states are not limited to these examples. For example, a synchronization state between each image capturing apparatus 100-X and a synchronization apparatus may be displayed. In addition to the state information described above, contents of setting made in each image capturing apparatus, an operation completion state, and/or the like may also be displayed.

In the examples described above, the states of the image capturing apparatuses 100-X are indicated by icons such as 2401 to 2410 shown in FIG. 27. However, the state of each image capturing apparatus 100-X may be displayed using a message. Of various pieces of information indicating the state of each image capturing apparatus 100-X, items thereof may be selectable. Furthermore, it may be selectable as to whether to display the state of each image capturing apparatus 100-X. The information display apparatus 400 may display information indicating the state of a particular image capturing apparatus 100-X corresponding to the position of a cursor operated by a user to issue an instruction. The information display apparatus 400 may display information indicating the state of a particular image capturing apparatus 100-X corresponding to an instruction operation performed, by a user, on a touch panel. The information display apparatus 400 may display an imaging parameter set in the image capturing apparatus 100-X as information indicating the state of the image capturing apparatus 100-X. The information display apparatus 400 may separately display a warning in a case where an image capturing apparatus 100-X is in a state in which it is difficult to generate a virtual viewpoint image, such as an error state, a warning state, a communication impossible state, or a state in which data can not be output. In a case where an image capturing apparatus 100-X is in a state in which there is a problem with producing a virtual viewpoint image, the information display apparatus 400 may display a warning by using an image, a color, or a message. In a case where some part, which is not limited to the image capturing apparatuses 100-X, of the system has a problem which may cause it to be difficult to generate virtual viewpoint image, the information display apparatus 400 may display a warning message such as "The system is in a condition that may cause a problem with a virtual viewpoint image. Check the settings as soon as possible and fix the problem." thereby giving a warning and prompting to fix the problem.

According to the present embodiment, the information display apparatus 400 displays information indicating the states of the image capturing apparatuses 100-X is displayed as shown in FIG. 27, which allows a user to grasp information related to an image capturing system including a plurality of image capturing apparatuses. Furthermore, the information display apparatus 400 allows the user to easily grasp which image capturing apparatus is in what state. Furthermore, for example, the information display apparatus 400 identifiably displays an image capturing apparatus 100-X in which an error occurs in imaging, and thus a user can grasp the image capturing apparatus 100-X in which the error occurs.

Description of Group Overview List View

FIG. 28 illustrates another example in which states of image capturing apparatuses 100-X indicated on the display image in FIG. 15 are shown in the form of a list. More specifically, FIG. 28 shows a list indicating an overview of the states of one or more groups of image capturing apparatuses 100-X that are set to capture of images of particular imaging target areas (1205 and 1206) (connected via lines). Hereinafter, this group is referred to as an imaging target area group. The list view shown in FIG. 28 is referred to as a group state overview list view.

For example, contents of a group overview list of an imaging target area group includes the following:

Connection status (connected/not connected) between image capturing apparatuses in the imaging target area group Error status (occurred/not occurred) of each image capturing apparatus in the imaging target area group Warning status (occurred/not occurred) of each image capturing apparatus in the imaging target area group Bypass status (bypassed/not bypassed) of each image capturing apparatus in the imaging target area group Configuration of each image capturing apparatus in the imaging target area group (in terms of use of a camera platform, a microphone, etc.)

Output status (being output/not output) of each image capturing apparatus in the imaging target area group Mechanical operation status (operating/not operating) of each image capturing apparatus in the imaging target area group These are the same contents as those shown in the example FIG. 27. In the list view shown in FIG. 28, the following are also displayed.

ISO value of each image capturing apparatuses in the imaging target area group

Iris value of each image capturing apparatuses in the imaging target area group

Figure 29:
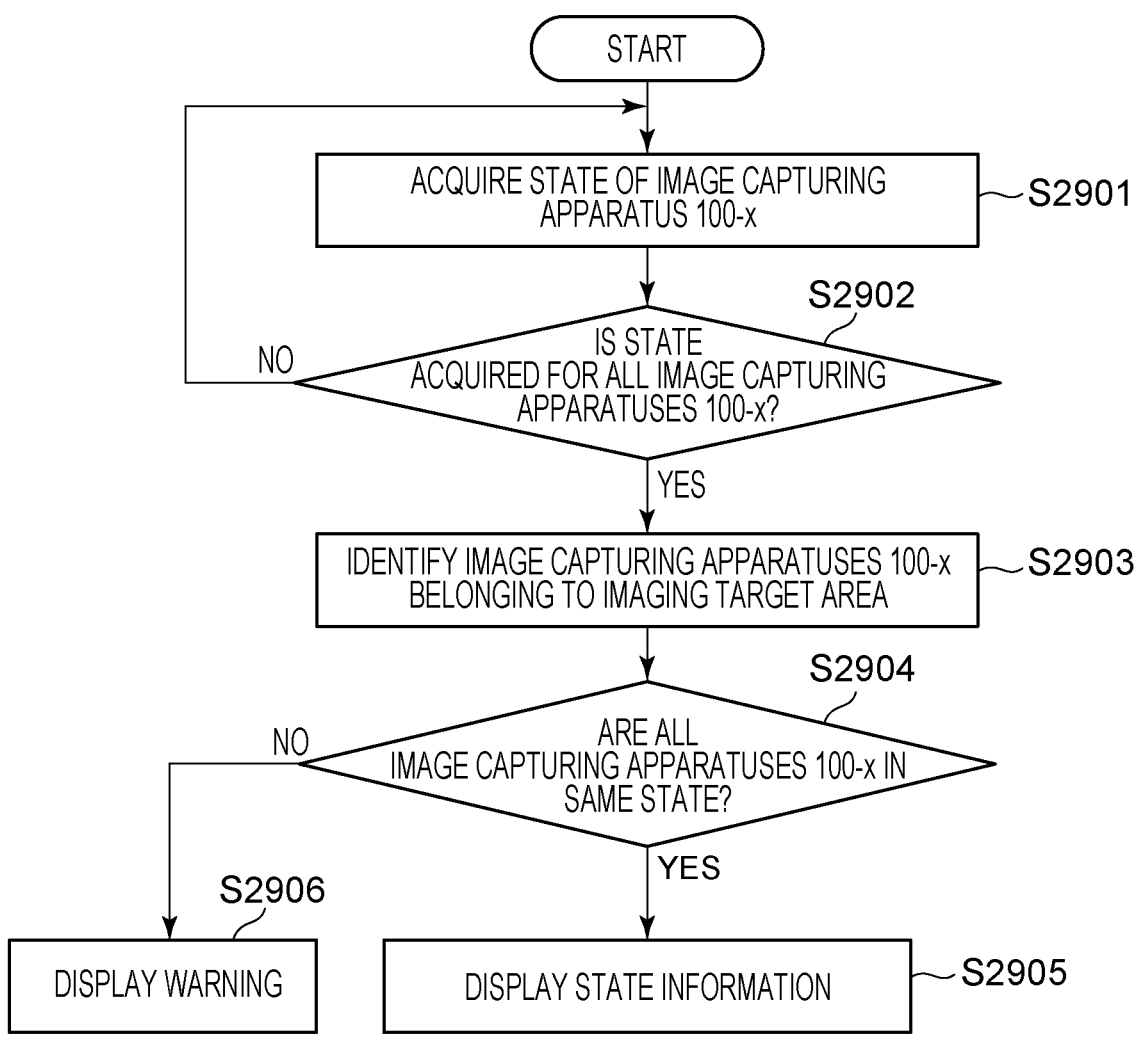
FIG. 29 is a flow chart illustrating a display process performed by an information display apparatus.

Shutter speed value of each image capturing apparatuses in the imaging target area group ND (NEUTRAL DENSITY) filter value of each image capturing apparatuses in the imaging target area group FIG. 29 is a flow chart of a process of displaying the group state overview list shown in FIG. 28 by the state acquisition unit 405 and the UI generation unit 403 of the information display apparatus 400. The process of this flow chart is started when a predetermined operation by user is received. The state acquisition unit 405 acquires state information related to the image capturing apparatuses 100-X from the state information storage unit 104 for all the image capturing apparatuses 100-X, and outputs the result to the UI generation unit 403 (S2901, S2902). The UI generation unit 403 identifies image capturing apparatuses 100-X belonging to an imaging target area group to be displayed in the form of a list (S2903), and compares the state information to each other (S2904). In a case where the state information is identical for all the image capturing apparatuses 100-X, the state information is displayed (S2905). If there is a difference in the state information among one or more image capturing apparatuses 100-X, a warning is displayed (S2906). In the examples shown in FIG. 28, warnings displayed include an error state of an imaging target area group V2 and an iris value of an imaging target area group V1. These indicate that an error has occurred in one or more image capturing apparatuses 100-X, or that the iris value is different from that of the other image capturing apparatuses 100-X. Although in the example shown in FIG. 28, warnings are indicated by using asterisk marks, the warnings may be indicated by other information. For example, a warning may be given by displaying a message such as "There is a difference in exposure condition among image capturing apparatuses in an imaging target area group, and thus a problem may occur in a virtual viewpoint image". A warning may be given by displaying a color or an image indicating a warning.

As described above, according to the present embodiment, the imaging target group state overview list related to the imaging target area group is displayed. Thus, it is possible to make a user easily recognize a possibility that the virtual viewpoint image may have a problem due to the difference in exposure condition among the image capturing apparatuses used for capturing a plurality of images for use in generating the virtual viewpoint image, and to make the user to take action.

Description of Group Detail List View

FIG. 30 shows an example in which states of respective image capturing apparatuses 100-X belonging to the imaging target area group V2 shown in FIG. 28 are displayed in the form of a list (this list view is referred to as a group state detail list view). Unlike the group state overview list view, the group state detail list view indicates the state of each image capturing apparatus 100-X belonging to the group. Therefore, when a warning is found in the group state overview list view, a specific warning location can be identified by switching the view to the group status detail list view. FIG. 30 indicates that an image capturing apparatus 100-2 has a temperature error, and thus a warning is displayed FIG. 28. The information display apparatus 400 does not need to display all information described in FIG. 30, but may display some part of the information.

Figure 31:
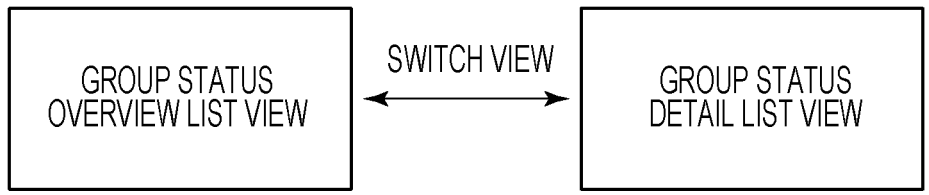
FIG. 31 is a conceptual diagram illustrating an operation of switching a list view.

FIG. 31 illustrates an operation, by the UI generation unit 403, to switch the view between the group state overview list view and the group state detail list view. The UI generation unit 403 switches the view between the group state overview list view and the group state detail list view based on the operation information (a view switching operation) input via the user input unit 407. For example, when the information display apparatus 400 is displaying an imaging target group state overview list, if a tap operation or an instruction at a position corresponding to "V2" which is identification information of an imaging target area group is received from a user, the information display apparatus 400 switches the view to the group status detail list view. On the other hand, when the information display apparatus 400 is displaying a group state detail list, if a tap operation or an instruction at a position corresponding to a "return" message icon (not shown) is received, the information display apparatus 400 switches the view to the imaging target group state overview list view.

The example has been described above in which the states of the image capturing apparatuses 100-X are displayed as the imaging target area group list view. Note that the displayed contents are not limited to those described in the example. The synchronization status between each image capturing apparatus 100-X and the synchronization apparatus may be displayed. In addition to the state information described above, contents of setting made in each image capturing apparatus, an operation completion state, and/or the like may also be displayed. The group is not limited to the imaging target area group. A list may be displayed for each connection group, or each installation area may be treated as a group and a list may be displayed for each installation area group.

Description of Operation UI

Figure 32:
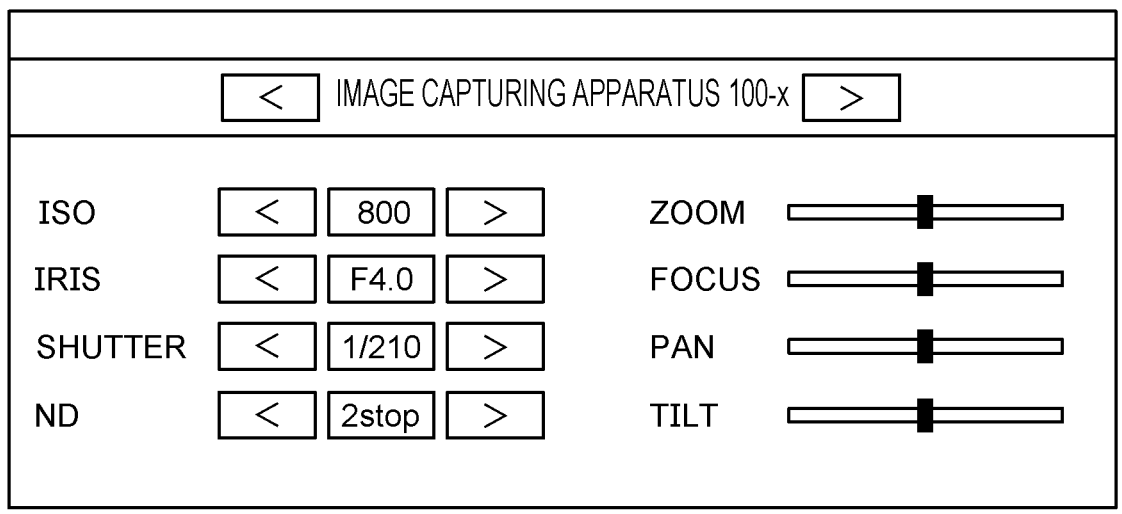
FIG. 32 is a diagram illustrating an example of an operation UI for operating an image capturing apparatus.
Figure 33:
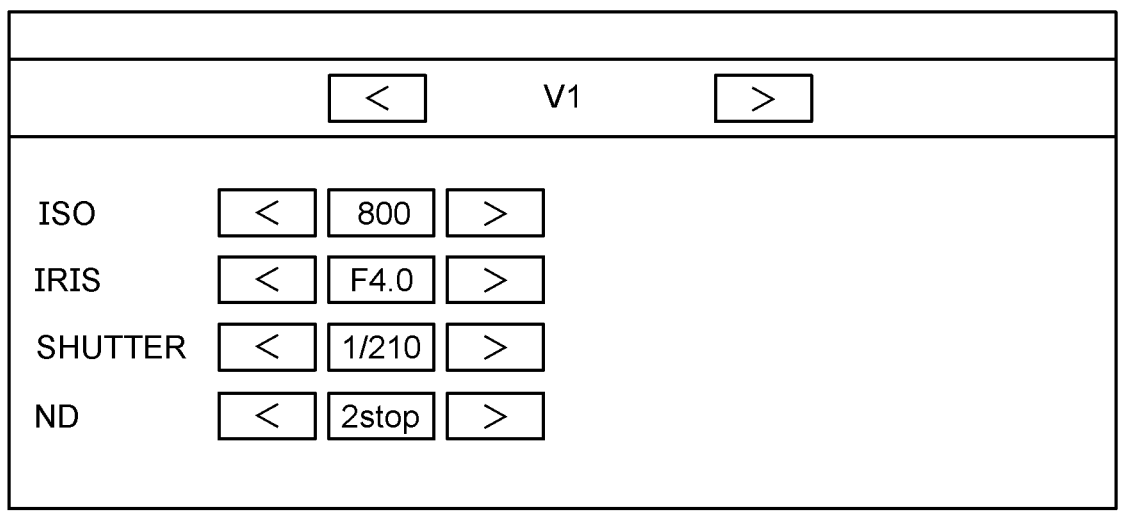
FIG. 33 is a diagram illustrating an example of an operation UI for operating an image capturing apparatus.

FIGS. 32 and 33 are diagrams each showing an example of an operation UI for operating the image capturing apparatus 100-X displayed by the information display apparatus 400 according to the present embodiment. FIG. 32 shows a UI for receiving an instruction for operating the individual image capturing apparatus 100-X displayed by the information display apparatus 400. The information display apparatus 400 transmits, to the image capturing apparatuses 100-X, information for setting the imaging parameters of the image capturing apparatuses 100-X and operating the image capturing apparatuses 100-X in accordance with the operation by the user. Using the operation UI, it is possible to set at least the zoom of the image capturing apparatus 100-X, the ISO for determining the exposure condition, the iris, the shutter speed, and the ND filter. In addition, when the image capturing apparatus 100-X has a camera platform, it is possible to set PAN and TILT.

FIG. 33 is an operation image for collectively operating all image capturing apparatuses 100-X belonging to the imaging target area group. On the operation image, it is possible to set, at least, ISO, iris, shutter speed, and ND filter which determine the exposure condition. As described above, the information display apparatus 400 can accept settings and operations of a plurality of image capturing apparatuses belonging to the imaging target area group from the user and reflect them on the image capturing apparatuses.

Figure 39:
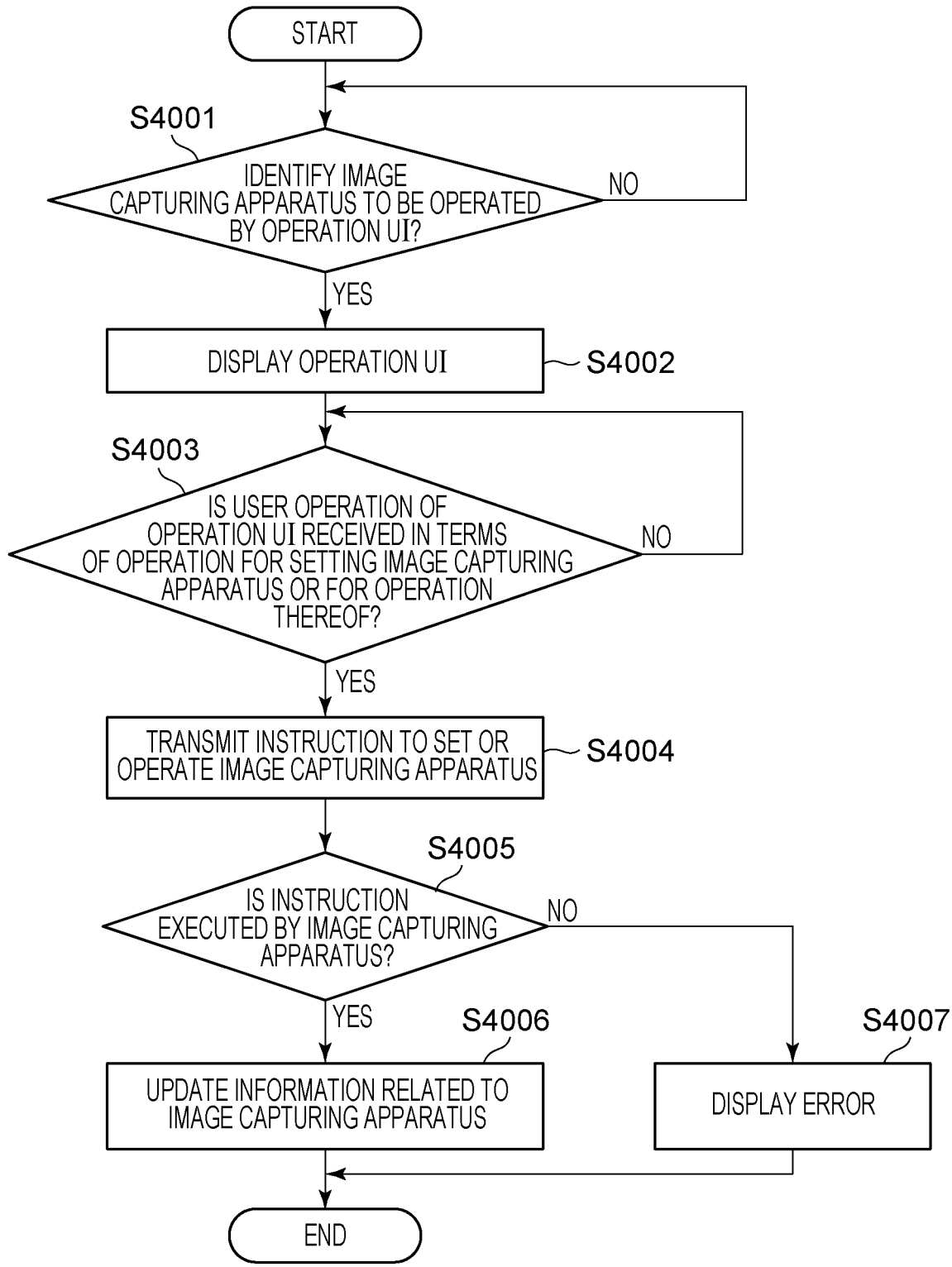
FIG. 39 is a flow chart illustrating a process of setting an image capturing apparatus using an operation UI of information display apparatus.

FIG. 39 is a flow chart showing a process for causing the information display apparatus 400 to display the operation UI and reflecting the setting accepted from the user on the image capturing apparatus 100-X. The information display apparatus 400 determines whether a user operation for specifying the image capturing apparatus 100-X to be operated by the operation UI has been received (S4001).

In S4001, it is determined, for example, whether or not an operation for displaying an operation UI has been performed on a circle 1203 when a layer for displaying information on image capturing apparatuses 100-X is being displayed as shown in FIG. 15. In this case, an image capturing apparatus 100-X corresponding to the circle 1203 on which the operation is performed is determined as an image capturing apparatus 100-X to be displayed as a target apparatus of the operation UI. Furthermore, it is determined whether or not an operation for displaying the operation UI is performed on an imaging target area 1205 or 1206 when a drawing layer for displaying an imaging target area is being displayed as shown in FIG. 15. In this case, image capturing apparatuses 100-X belonging to an imaging target area group corresponding to the imaging target area on which the operation is performed is determined as image capturing apparatuses 100-X to be displayed as target apparatuses of the operation UI.

Furthermore, it is determined whether or not an operation for displaying the operation UI is performed on a line 1204 indicating a connection group when a drawing layer for displaying the connection group is being displayed as shown in FIG. 15. In this case, image capturing apparatuses 100-X belonging to a connection group corresponding to the connection group on which the operation is performed is determined as image capturing apparatuses 100-X to be displayed as target apparatuses of the operation UI.

Furthermore, it is determined whether or not an operation for displaying the operation UI is performed on an imaging target area group V1 or V2 when a group state overview list view is being displayed as shown in FIG. 28. In this case, image capturing apparatuses 100-X belonging to an imaging target group corresponding to the imaging target group on which the operation is performed is determined as image capturing apparatuses 100-X to be displayed as target apparatuses of the operation UI.

It is also determined whether or not an operation for displaying an operational UI has been performed on one of the image capturing apparatuses 100-1 to 100-n when the group state detail list view is being displayed as shown in FIG. 30. In this case, an image capturing apparatus 100-X on which the operation is performed is determined as an image capturing apparatus 100-X to be displayed as a target apparatus of the operation UI.

When the operation for specifying an image capturing apparatus 100-X to be operated by the operation UI is received, the information display apparatus 400 displays the operation UI as shown in FIG. 32 or FIG. 33 (S4002). The information display apparatus 400 determines whether a user operation for setting or operating the image capturing apparatus has been received via the operation UI (S4003). When a user operation for setting or operating the image capturing apparatus is received via the operation UI, the information display apparatus 400 transmits an instruction for reflecting the setting or operation on the image capturing apparatus (S4004). When the information display apparatus 400 transmits the instruction in S4004, the information display apparatus 400 makes a determination as to whether the instruction is reflected or not received based on the information received from the image capturing apparatus 100-X to which the instruction has been transmitted, as to whether the instruction has been reflected in the image capturing apparatuses 100-X (S4005). In a case where it is determined in S4005 that the instruction has been reflected in the image capturing apparatus 100-X, the information display apparatus 400 updates information so as to indicate the instruction has been reflected in the image capturing apparatus 100-X and so as to indicate the setting or the operation information on the image capturing apparatus 100-X, and the information display apparatus 400 displays the updated information (S4006). On the other hand, in a case where it is determined in S4005 that the instruction is not reflected in the image capturing apparatus 100-X, the information display apparatus 400 displays an error (S4007).

In the present embodiment, as described above, the information display apparatus 400 displays the plurality of image capturing apparatuses 100-X, the connection relationship, the installation area, and the imaging target area on a map of the stadium 210 such that they are linked. Furthermore, the state of each image capturing apparatus 100-X is also displayed together. Thus, even if the number of image capturing apparatuses 100-X increases, a user can grasp at a glance the system state such as the connection status, the installation status, and the influence range of imaging.

Furthermore, in the present embodiment, it is possible to appropriately add or delete desired information to or from currently displayed information such that, for example, only the connection group or only the imaging target area group or the like is displayed. Thus, even if the number of image capturing apparatuses 100-X or the number of connection groups increases, it is allowed to display only a specific group.

Furthermore, in the present embodiment, it is possible to check the state in units of connection groups or imaging target area groups. When a virtual viewpoint image is generated, if a problem occurs in an image capturing apparatus 100-X belonging to the imaging target area group, the generation thereof is greatly affected. The present embodiment allows it to grasp the degree of such a influence on generation of the virtual viewpoint image.

Furthermore, in the present embodiment, imaging parameters such as ISO and iris of the image capturing apparatuses 100-X can be controlled in units of connection groups or imaging target area groups. If a change occurs in an external light condition during imaging, then, in many cases, the exposure conditions are equally set to the same exposure condition for each imaging target area group imaging the same target area. In this case, control can be performed equally in units of imaging target area groups, and thus it is possible to quickly change the settings of image capturing apparatuses 100-X so as to achieve settings suitable for generating a virtual viewpoint image.

Modifications

Next, a modification of the above-described embodiment is described. In the modified example, a captured image output from the image capturing apparatus 100-X is superimposed and displayed on the UI. This makes it possible to more easily grasp the state of the image capturing apparatus 100-X.

Figure 34:
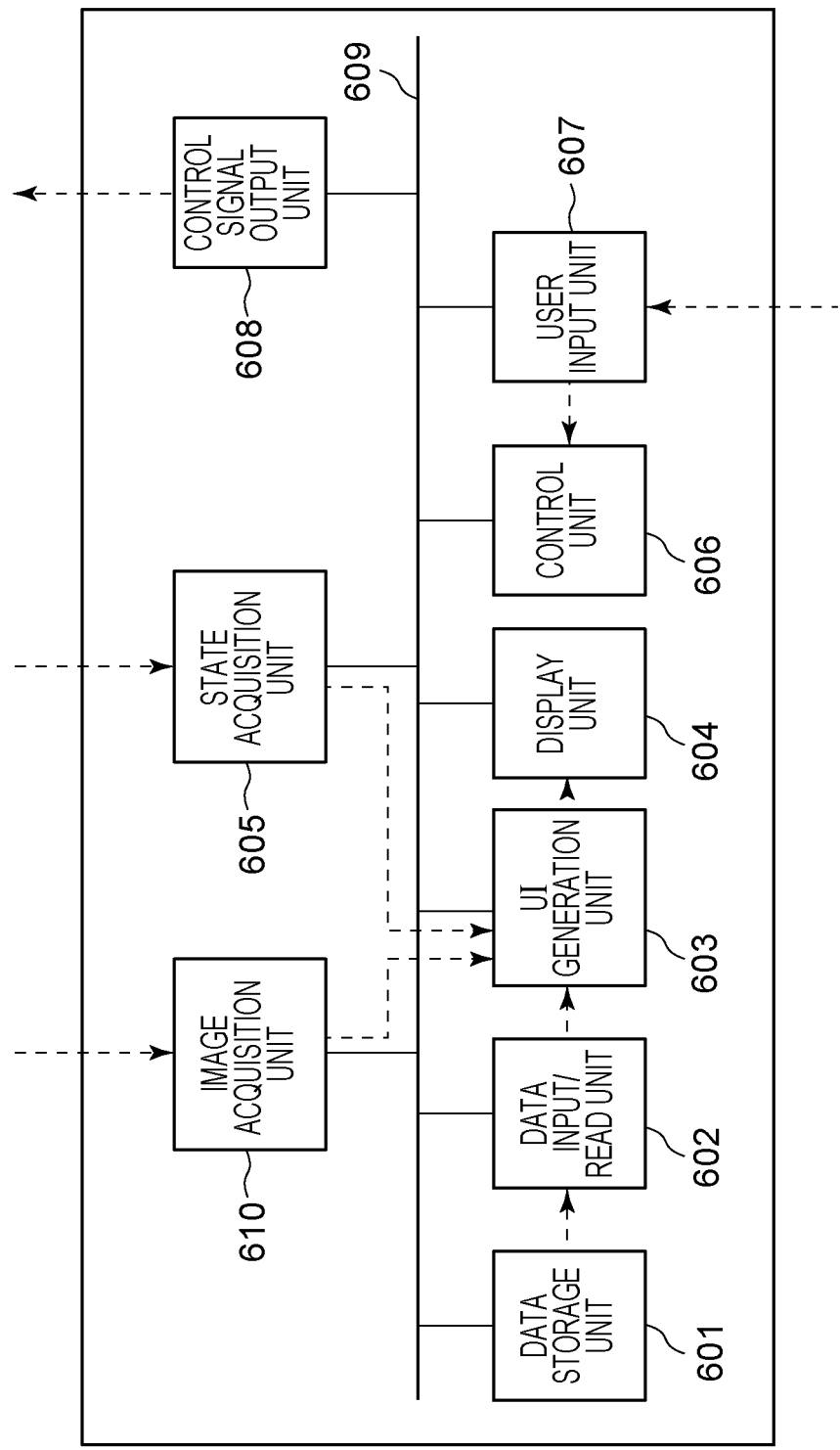
FIG. 34 is a diagram illustrating a modified example of a functional configuration of an information display apparatus.

FIG. 34 is a diagram showing an example of a functional configuration of an information display apparatus 400 according to a modification. The information display apparatus 400 according to the modification includes a data storage unit 601, a data reading unit 602, a UI generation unit 603, a display unit 604, a state acquisition unit 605, a control unit 606, a user input unit 607, a control signal output unit 608, and an image acquisition unit 610. These are interconnected via an internal bus 609, and can transmit and receive data mutually under the control of the control unit 606. The functional configuration shown in FIG. 34 is the same as the functional configuration shown in FIG. 10 except for the image acquisition unit 610, and thus a description thereof is omitted. The image acquisition unit 610 acquires a captured image output from each image capturing apparatus 100-X, and outputs the acquired image to the UI generation unit 603.

Figure 35:
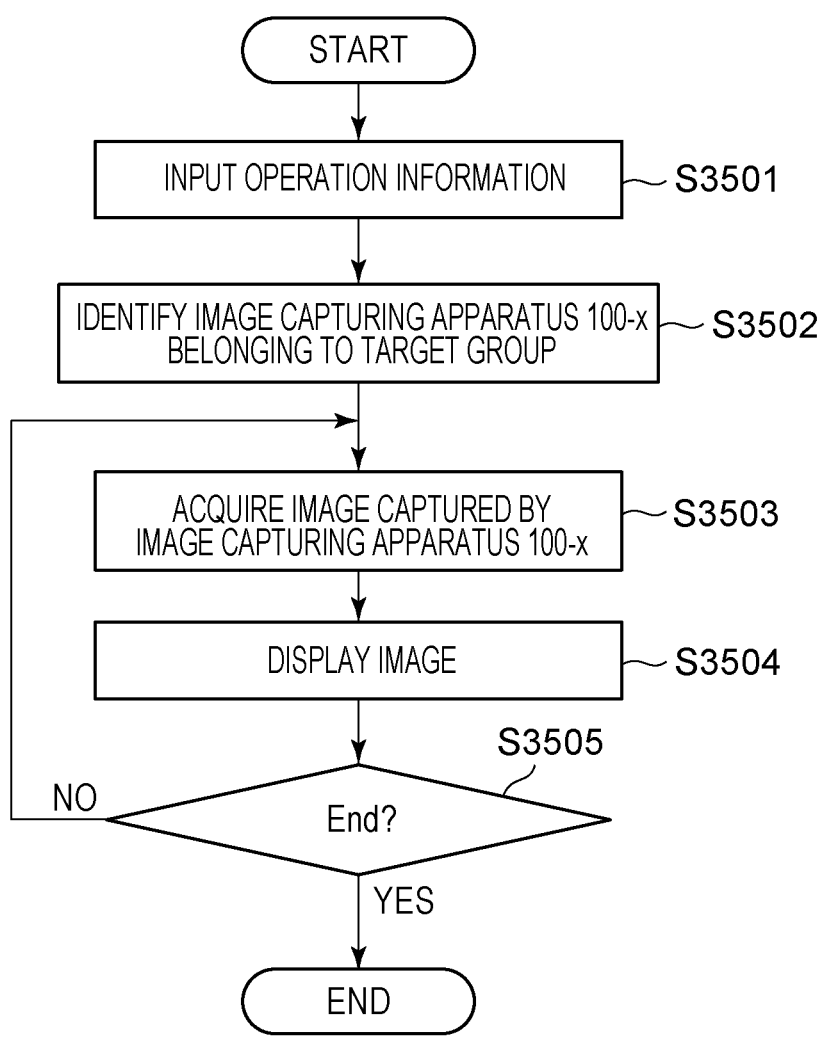
FIG. 35 is a flow chart illustrating an example of an image display process performed by an information display apparatus.

FIG. 35 is a flow chart illustrating an example of an image display process performed by the information display apparatus 400. A further description is given below assuming that the information display apparatus 400 displays the information shown in FIG. 15. The information display apparatus 400 acquires operation information for selecting an image capturing apparatus 100-X. The information display apparatus 400 accepts a selection operation performed by a user (a person in charge of monitoring) for selecting an image capturing apparatus 100-X (1203), a connection group (1204), an imaging target area (1205, 1206), or an installation area (1202) from those displayed on the UI. When the user (the person in charge of monitoring) selects an image capturing apparatus 100-X using a controller such as a keyboard and a mouse, the user input unit 607 outputs the operation information indicating the selection to the control unit 606 (S3501). The control unit 606 identifies the selected image capturing apparatus 100-X, or the group, or the area based on the operation information and the display image (S3502). The control unit 606 then acquires an image captured by the identified image capturing apparatus 100-X or the image capturing apparatus 100-X included in the group or area via the image acquisition unit 610, and outputs the image to the UI generation unit 603 (S3503). The UI generating unit 603 displays the input image captured by the image capturing apparatus 100-X so as to be superimposed on the display image (S3504). In a case where the image is a moving image, S3503 and S3504 are performed repeatedly (S3505).

Figure 36:
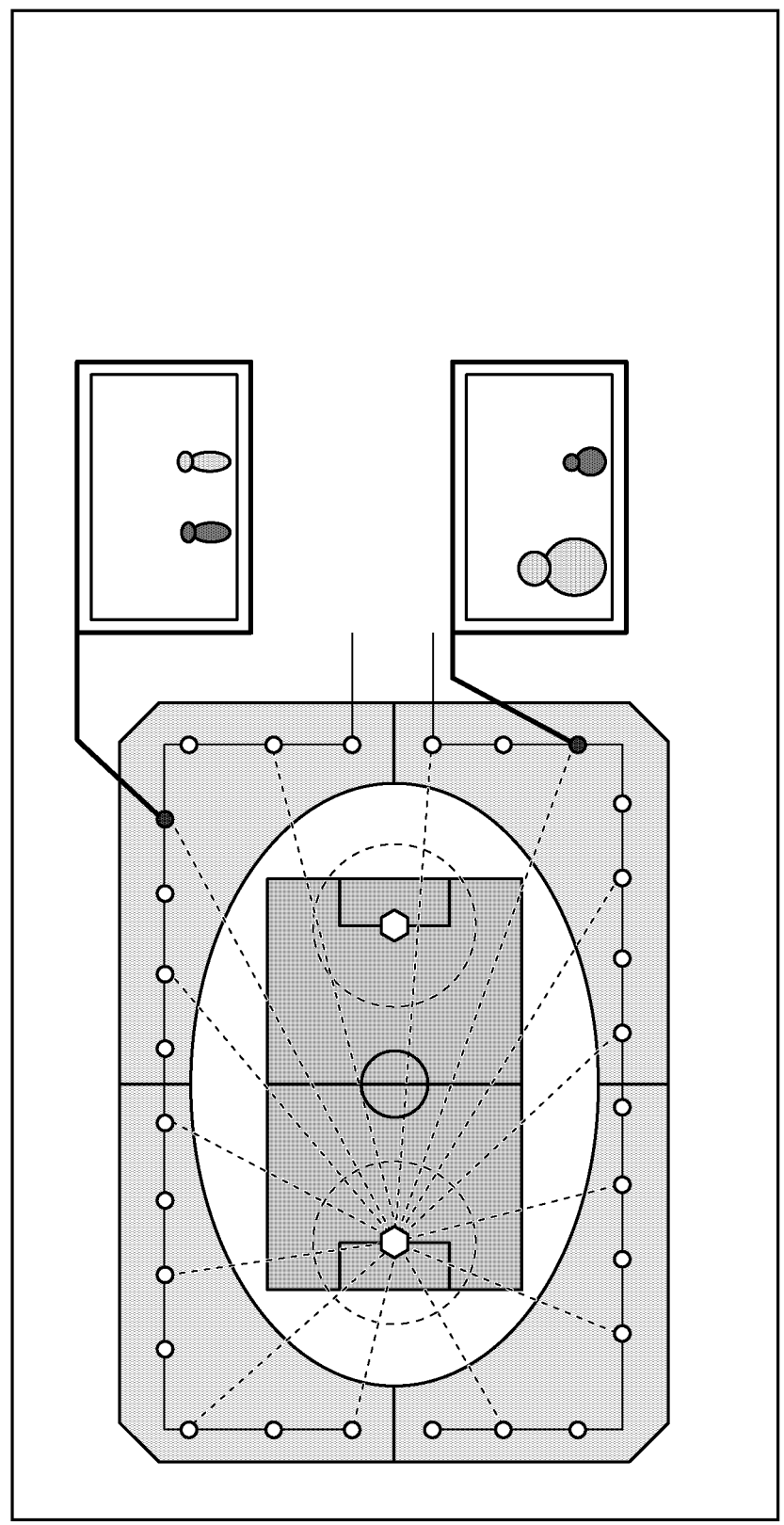
FIG. 36 is a diagram illustrating an example of a display image displayed by an information display apparatus.
Figure 37:
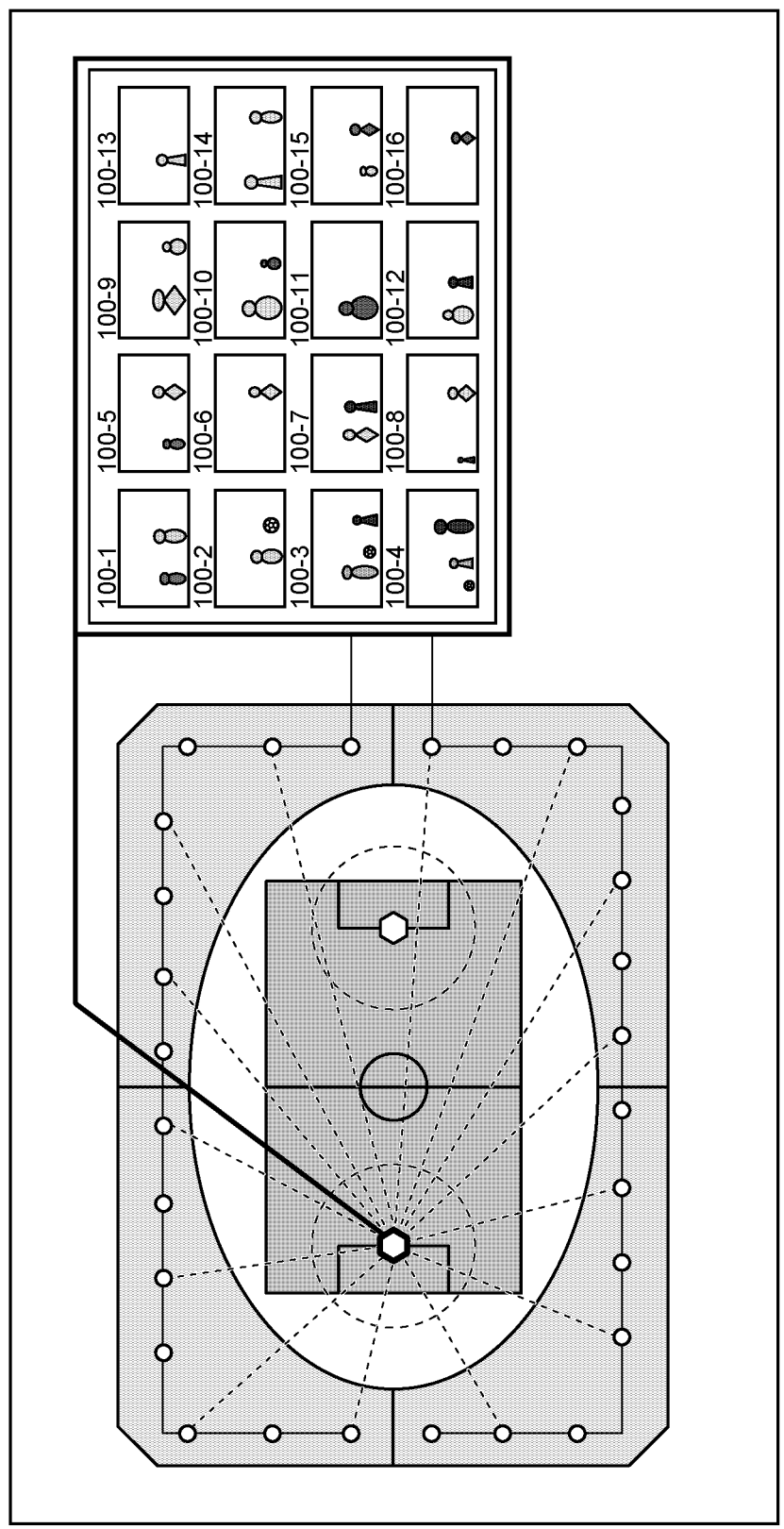
FIG. 37 is a diagram illustrating an example of a display image displayed by an information display apparatus.
Figure 38:
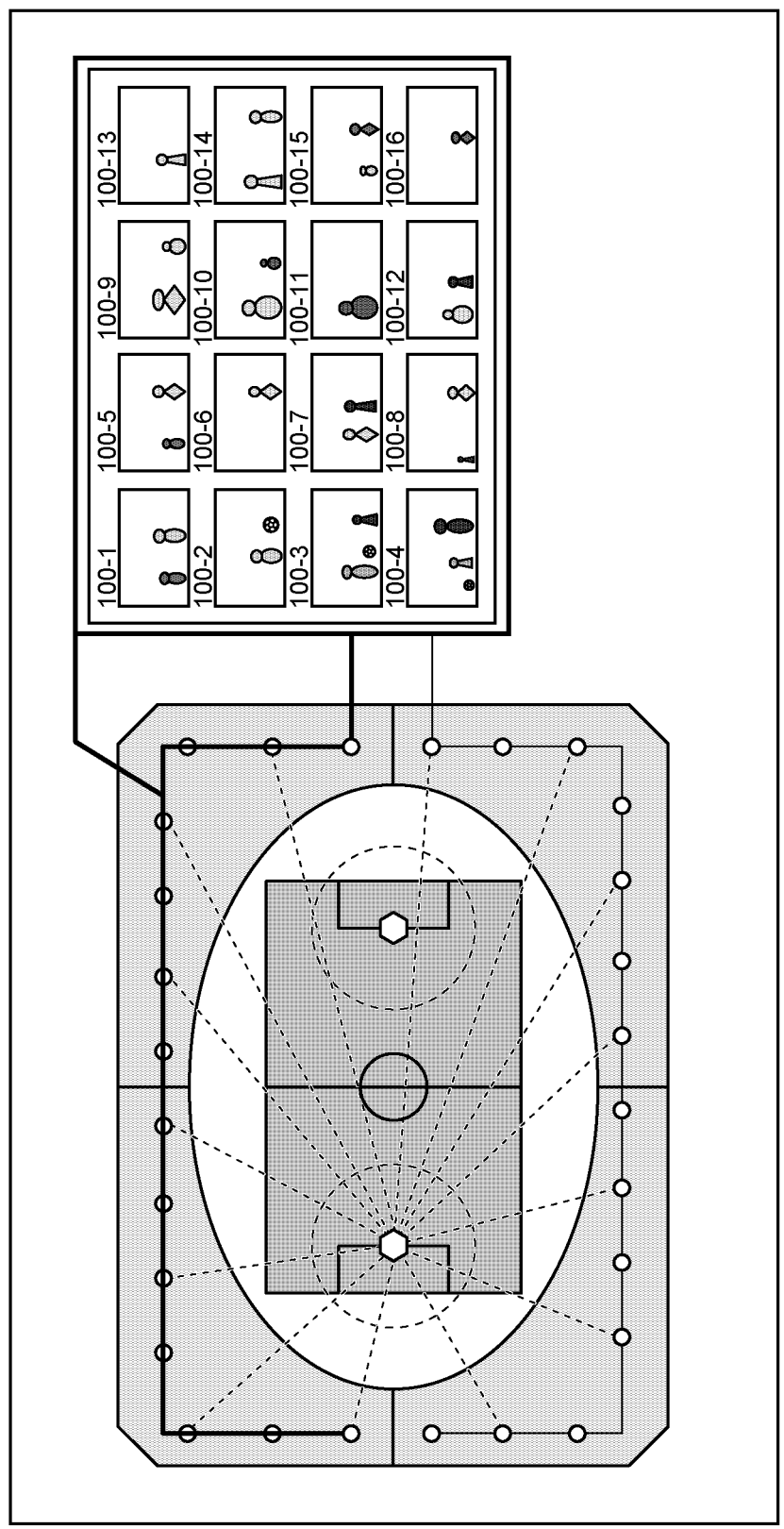
FIG. 38 is a diagram illustrating an example of a display image displayed by an information display apparatus.

FIG. 36 to FIG. 38 are diagrams each showing an example of an operation UI for displaying a captured image displayed by the information display apparatus 400 in a superimposed manner. FIG. 36 shows an example for a case where a user (a person in charge of monitoring) selects individual image capturing apparatuses 100-X on the display image. An image captured by the selected image capturing apparatus 100-X is displayed. FIG. 37 shows an example where the center point of an imaging target area on the display image is selected. A list of images of all image capturing apparatuses 100-X belonging to the selected imaging target area is displayed. FIG. 38 shows an example in which a connection group on a display image is selected. A list of images of all image capturing apparatuses 100-X belonging to the selected connection group is displayed.

Figure 40:
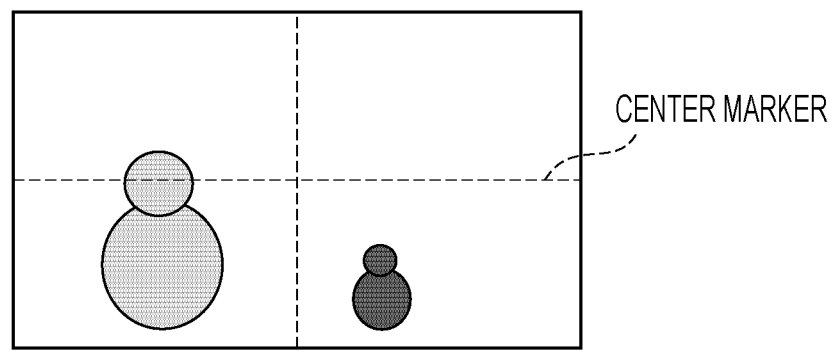
FIG. 40 is a diagram illustrating an example of a display image displayed by an information display apparatus.

In a next example described below, a guide indication for checking a position of an image capturing apparatus 100-X, a guide indication for checking an exposure condition, and a guide indication for checking focus are further displayed so as to be superimposed on a captured image displayed by the information display apparatus 400 shown in FIGS. 36 to 38. FIG. 40 shows an example in which a center marker, which is a guide indication for checking a position of an image capturing apparatus 100-X, is displayed on a captured image. A user is allowed to check whether the image capturing apparatus 100-X is correctly installed by checking a guide indication, shown in FIG. 40, for checking the position of the image capturing apparatus 100-X.

Figure 41:
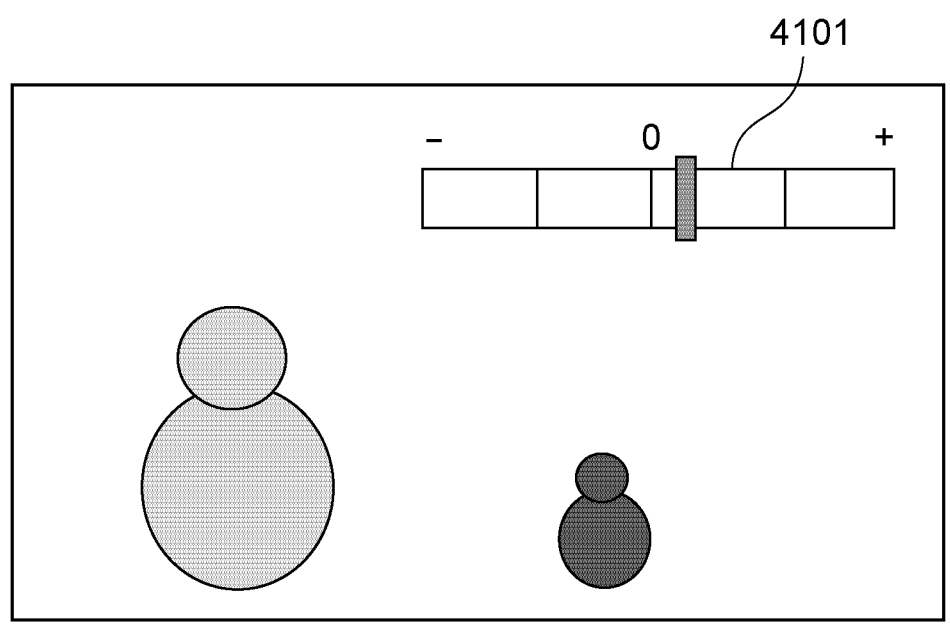
FIG. 41 is a diagram illustrating an example of a display image displayed by an information display apparatus.

FIG. 41 shows an example in which an exposure guide bar 4101 which is a guide indication for checking the exposure state of the image capturing apparatus 100-X is displayed on a captured image. The exposure guide bar 4101 shown in FIG. 41 is a guide indication indicating whether the exposure amount set in the image capturing apparatus 100-X is larger or smaller than an appropriate exposure measured by an exposure meter of the image capturing apparatus 100-X. The exposure guide bar 4101 is, for example, a slide bar. On the exposure guide bar 4101, a scale of zero indicates proper exposure. An area in which the slider is shifted in a positive direction is an overexposure area. An area in which the slider is shifted in a negative direction is an underexposure area.

When the information display apparatus 400 receives, from a user, an operation to change the position of the slider of the exposure guide bar 4101, the information display apparatus 400 may transmit information for instructing the image capturing apparatuses 100-X to perform exposure correction according to the operation. A user is allowed to check whether the exposure amount is properly set in the image capturing apparatus 100-X by checking a captured image and a guide indication, shown in FIG. 41, for checking the exposure condition set in the image capturing apparatus 100-X.

Figure 42:
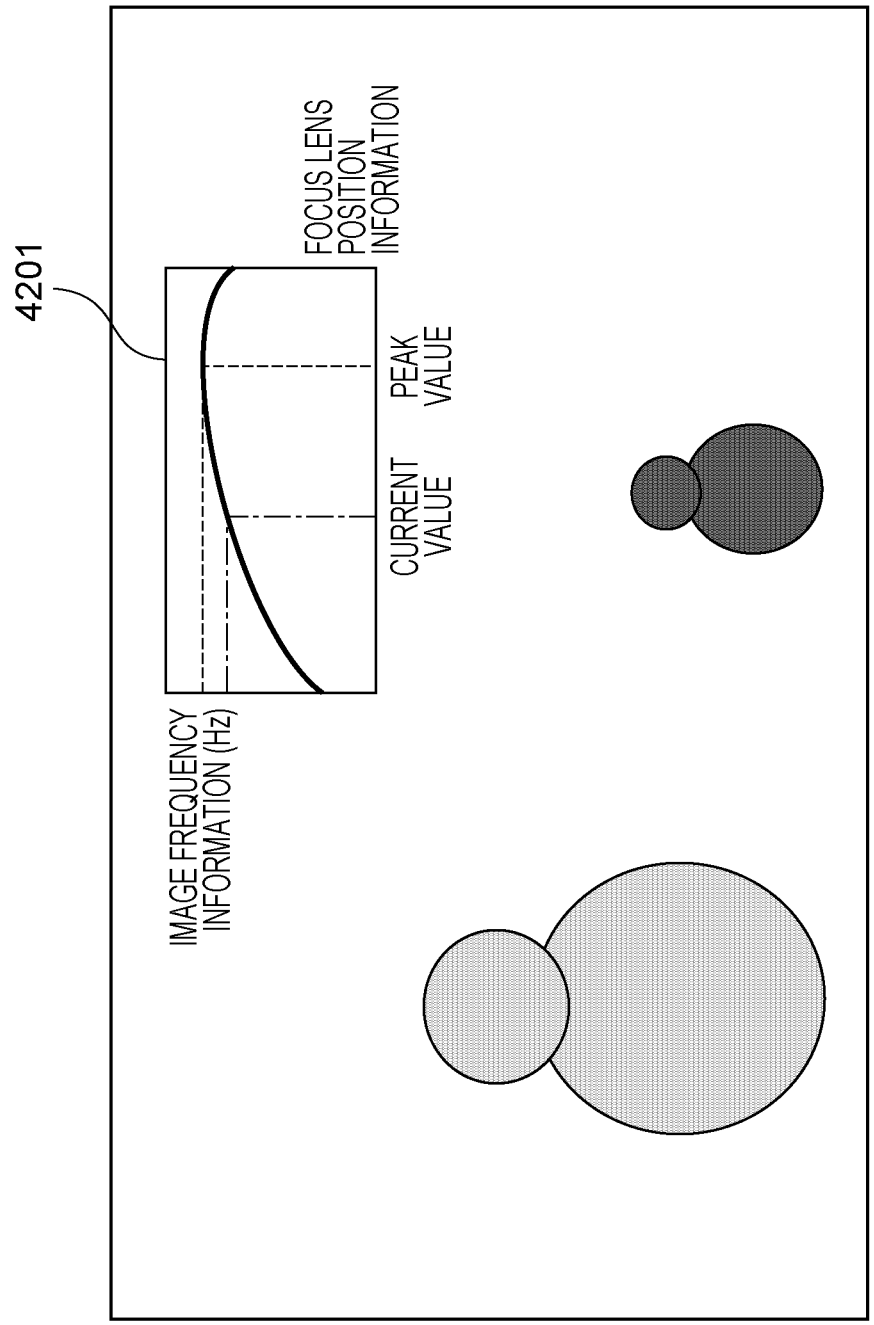
FIG. 42 is a diagram illustrating an example of a display image displayed by an information display apparatus.

FIG. 42 illustrates an example in which a focus state indication 4201 for checking a focus state of the image capturing apparatus 100-X is displayed on a captured image. The focus state indication 4201 shown in FIG. 42 is a guide indication for indicating an in-focus position of the image capturing apparatus 100-X and for adjusting the focus. In the focus state indication 4201 shown in FIG. 42, a horizontal axis indicates focus lens position information. The in-focus position of the image capturing apparatus 100-X changes as the focus lens moves. In the focus state indication 4201 shown in FIG. 42, a vertical axis indicates frequency information of a captured image as a function of focus lens position information. The more proper the in-focus position, the higher the frequency of the captured image. A lens position at which the captured image has a highest frequency is denoted by "peak value". The current lens position is denoted by "current value". When the "peak value" and the "current value" are deviated, the captured image is very likely to be blurred. When the information display apparatus 400 receives an operation performed on the focus state indication 4201 by a user to change the current value, the information display apparatus 400 may transmit information for instructing the image capturing apparatus 100-X to change the position of the focus lens according to the operation. A user is allowed to check whether the in-focus position is properly set in the image capturing apparatus 100-X by checking a captured image and a guide indication, shown in FIG. 42, for checking the focus state indication of the image capturing apparatus 100-X.

Figure 43:
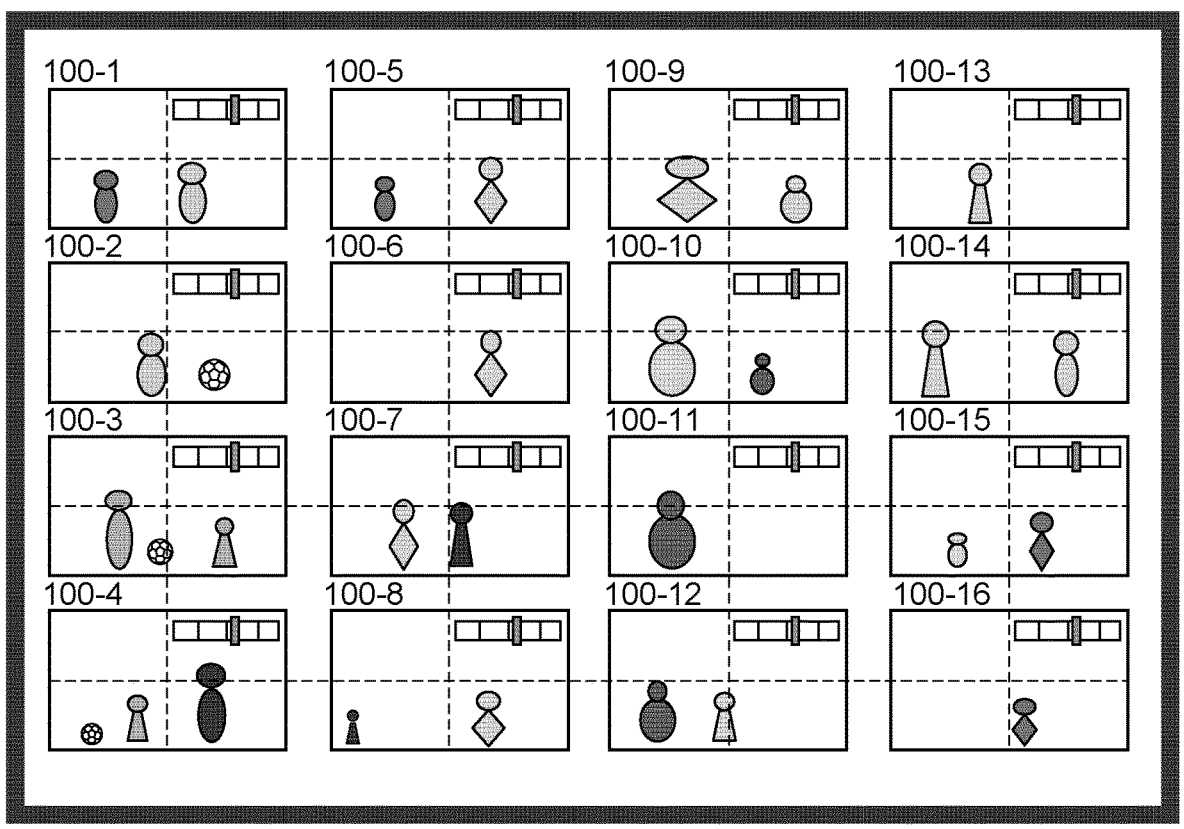
FIG. 43 is a diagram illustrating an example of a display image displayed by an information display apparatus.

FIG. 43 illustrates an example of a UI in which the center marker shown in FIG. 40 and the exposure guide bar shown in FIG. 41 are superimposed on a list of images of the image capturing apparatuses 100-X shown in FIG. 37 or FIG. 38. The information display apparatus 400 may transmit an instruction of exposure correction to the corresponding image capturing apparatus 100-X when one of the exposure guide bars is operated. As described above, by displaying a list of information indicating the state of the image capturing apparatuses 100-X together with the captured images, a user can grasp the positions and exposure conditions of the plurality of image capturing apparatuses precisely at a time. In FIG. 43, the focus state indication shown in FIG. 42 may be further superimposed. Note that the form of displaying above-described guide indications is merely an example, and guide indications may be displayed in other forms, such as a character or a numerical value. In the modification, as described above, an image captured by a selected image capturing apparatus 100-X, or images captured by all image capturing apparatuses 100-X belonging to an imaging target area or a connection group are displayed. Thus, actual captured images output by image capturing apparatuses 100-X linked to an area or a group can also be checked, and the state of the system can be more accurately grasped.

Figure 44:
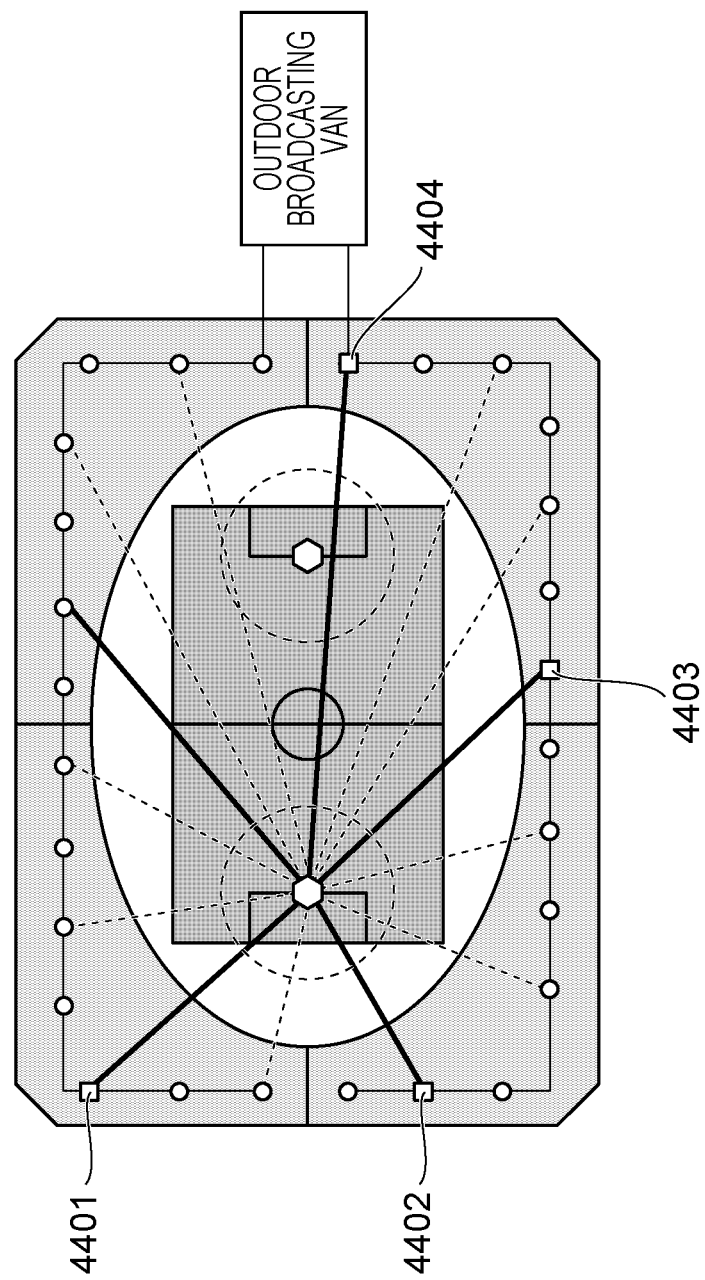
FIG. 44 is a diagram illustrating an example of a display image displayed by an information display apparatus.

Another example of a modification is described below with reference to FIG. 44. FIG. 44 is a diagram illustrating an example of a display image displayed by the information display apparatus 400. A difference from the display image described above with reference to FIG. 15 is described in detail below. In FIGS. 44, 4401 to 4404 indicate that a zoom lens is attached to each corresponding image capturing apparatus 100-X. In FIG. 44, an area imaged by image capturing apparatuses 100-X (4401 to 4404) with a zoom lens attached thereto and thus having a relatively small angle of view is denoted by a solid line or a thick line which is different from a manner of denoting image capturing apparatuses 100-X with no attached zoom lens. As described above, by displaying a display image including information on the angle of view of the image capturing apparatus 100-X as illustrated by way example in FIG. 44, a user can easily grasp the difference in angle of view among the plurality of image capturing apparatuses 100-X. Note that information on the angle of view of each of the plurality of image capturing apparatuses 100-X may be displayed in other forms such as in characters or numerical values.

In the above embodiments, the description has been focused on the case where information on the image capturing apparatuses 100-X is displayed by way of example but not limitation. That is, the information display apparatus 400 according to the present embodiment may also display a state of a device related to the system for generating a virtual viewpoint image in addition to or in place of the image capturing apparatuses 100-X. Examples of devices related to the system for generating a virtual viewpoint image may include network devices such as switches, routers and/or the like, the image generation apparatus 200, and the synchronization apparatus, and states of these devices may be displayed by the information display apparatus 400. That is, the information display apparatus 400 may display an image indicating a state of a component of the system for generating the virtual viewpoint image. In the example described above, the description is focused on the case where by way of example but not limitation, the information display apparatus 400 detects an occurrence of a change in a state information based on the state information supplied from the image capturing apparatuses 100-X. For example, when state information has not been received from an image capturing apparatus 100-X for a predetermined time, it may be determined that a change in the state of this image capturing apparatus 100-X has occurred.

Also note that the components described in the above-described embodiments are merely examples, and the scope of the present invention is not limited to them. All combinations of constituent elements described above in the embodiments are not necessarily needed as means for solving the problems. Various modifications and changes are possible within the scope of the present invention described in the claims. For example, in the above-described embodiments, it may be allowed to display only a part of the display image described above, replace a part of the display image with other information, and/or superimpose additional information on the display image.

Other Embodiments

The present invention may also be realized by providing a program for realizing one or more functions of the embodiment to a system or an apparatus via a network or a storage medium, and reading and executing the program by one or more processors in a computer disposed in the system or the apparatus. The present invention may also be realized by a circuit (for example, an ASIC or the like) configured to realize one or more functions. The program may be provided via a computer-readable storage medium in which the program is stored.

The present invention is not limited to the above-described embodiments, but various changes and modifications can be made without departing from the spirit and scope of the present invention. Accordingly, the following claims are attached to disclose the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A display control apparatus comprising:
one or more memories storing instructions; and
one or more processors executing the instructions to:
generate an image including information for specifying a communication connection state among a plurality of image capturing apparatuses which is configured to be connected via a daisy chain connection, which is configured to acquire captured images to generate a virtual view point image and which is configured to transmit, via the daisy chain connection, images of objects included in the captured images, information for specifying positions at which the plurality of image capturing apparatuses is installed, and information for identifying an image capturing apparatus directed to a predetermined region; and
cause a display device to display the generated image.

2. The display control apparatus according to claim 1, wherein the plurality of image capturing apparatuses is configured to extract regions of objects included in the captured images and configured to generate the images of objects based on the extracted regions of objects.

3. The display control apparatus according to claim 1, wherein the objects are moving objects.

4. The display control apparatus according to claim 1, wherein the objects include at least one of a person and a ball.

5. A display control apparatus comprising:
one or more memories storing instructions; and
one or more processors executing the instructions to:
generate an image including information for specifying a communication connection state among a plurality of image capturing apparatuses which is configured to be connected via a daisy chain connection, which is configured to acquire captured images to generate a virtual view point image and which is configured to transmit the captured images via the daisy chain connection, information for specifying positions at which the plurality of image capturing apparatuses is installed, and information for identifying an image capturing apparatus directed to a predetermined region; and
cause a display device to display the generated image.

6. The display control apparatus according to claim 5, wherein a captured image acquired by at least one of the plurality of image capturing apparatuses is displayed together with the generated image via the display device.

7. The display control apparatus according to claim 6, wherein the display device displays at least one of information on an orientation of at least one of the plurality of image capturing apparatuses, information on focus, and information on exposure, superimposed on a captured image captured by the at least one of the plurality of image capturing apparatuses.

8. The display control apparatus according to claim 1, wherein the generated image indicates the communication connection state among the plurality of image capturing apparatuses, the positions at which the plurality of image capturing apparatuses is installed, and the information for identifying the image capturing apparatus directed to the predetermined region.

9. The display control apparatus according to claim 1, wherein the one or more processors further execute the instructions to control displaying/hiding of at least one of display elements including the communication connection state among the plurality of image capturing apparatuses based on a user operation.

10. The display control apparatus according to claim 1,
wherein each of the plurality of image capturing apparatuses is directed to one of a plurality of regions to be imaged, and
wherein the generated image includes information for identifying an image capturing apparatus directed to one of the plurality of regions to be imaged as the information for identifying the image capturing apparatus directed to the predetermined region.

11. The display control apparatus according to claim 1, wherein the generated image includes information for specifying imaging directions of the plurality of image capturing apparatuses as the information for identifying the image capturing apparatus directed to the predetermined region.

12. The display control apparatus according to claim 11, wherein the imaging directions are indicated by line segments.

13. The display control apparatus according to claim 12, wherein in the generated image, a line segment indicating an imaging direction of a first image capturing apparatus of the plurality of image capturing apparatuses and a line segment indicating an imaging direction of a second image capturing apparatus different from the first image capturing apparatus of the plurality of image capturing apparatuses do not intersect with each other.

14. The display control apparatus according to claim 1, wherein an image in which graphics indicating states of the plurality of image capturing apparatuses are arranged at positions corresponding to the positions at which the plurality of image capturing apparatuses is installed is generated.

15. The display control apparatus according to claim 14, wherein the graphics indicate at least one of a data output state of each of the plurality of image capturing apparatuses and an error state of each of the plurality of image capturing apparatuses.

16. The display control apparatus according to claim 1, wherein the one or more processors further execute the instructions to transmit information for setting an imaging parameter of at least one of the plurality of image capturing apparatuses to the at least one of the plurality of image capturing apparatuses.

17. The display control apparatus according to claim 1, wherein the generated image further includes information for specifying an imaging parameter set in at least one of the plurality of image capturing apparatuses.

18. The display control apparatus according to claim 16, wherein the imaging parameter is at least one of an aperture, a shutter speed, an ISO sensitivity, and a zoom.

19. The display control apparatus according to claim 1, wherein the one or more processors further execute the instructions to determine that at least one of the plurality of image capturing apparatuses is in an error state, in which the at least one of the plurality of image capturing apparatuses is unable to output data, the at least one of the plurality of image capturing apparatuses is not connected, or the at least one of the plurality of image capturing apparatuses is unable to capture an image, and wherein a warning according to the determination result is displayed via the display device.

20. The display control apparatus according to claim 1, wherein the generated image further includes information on an angle of view of at least one of the plurality of image capturing apparatuses.

21. A display control method comprising:

generating an image including information for specifying a communication connection state among a plurality of image capturing apparatuses which is configured to be connected via a daisy chain connection, which is configured to acquire captured images to generate a virtual view point image and which is configured to transmit, via the daisy chain connection, images of objects included in the captured images, information for specifying positions at which the plurality of image capturing apparatuses is installed, and information for identifying an image capturing apparatus directed to a predetermined region; and causing a display device to display the generated image.

22. A display control method comprising:

generating an image including information for specifying a communication connection state among a plurality of image capturing apparatuses which is configured to be connected via a daisy chain connection, which is configured to acquire captured images to generate a virtual view point image and which is configured to transmit the captured images via the daisy chain connection, information for specifying positions at which the plurality of image capturing apparatuses is installed, and information for identifying an image capturing apparatus directed to a predetermined region; and causing a display device to display the generated image.

23. A non-transitory computer-readable recording medium storing a program for causing a computer to execute a display control method comprising:

generating an image including information for specifying a communication connection state among a plurality of image capturing apparatuses which is configured to be connected via a daisy chain connection, which is configured to acquire captured images to generate a virtual view point image and which is configured to transmit, via the daisy chain connection, images of objects included in the captured images, information for specifying positions at which the plurality of image capturing apparatuses is installed, and information for identifying an image capturing apparatus directed to a predetermined region; and causing a display device to display the generated image.

24. A non-transitory computer-readable recording medium storing a program for causing a computer to execute a display control method comprising:

generating an image including information for specifying a communication connection state among a plurality of image capturing apparatuses which is configured to be connected via a daisy chain connection, which is configured to acquire captured images to generate a virtual view point image and which is configured to transmit the captured images via the daisy chain connection, information for specifying positions at which the plurality of image capturing apparatuses is installed, and information for identifying an image capturing apparatus directed to a predetermined region; and causing a display device to display the generated image.

* * * * *